(12) United States Patent
Lohoff et al.

(10) Patent No.: US 11,351,737 B2
(45) Date of Patent: Jun. 7, 2022

(54) ENERGY APPARATUS AND METHODS OF PROVIDING ENERGY TO AN ITEM

(71) Applicant: Kimberly-Clark Worldwide, Inc., Neenah, WI (US)

(72) Inventors: Michael L. Lohoff, Oshkosh, WI (US); Craig R. Roble, Oshkosh, WI (US); Greg Rajala, Neenah, WI (US); Katherine M. Nackers, Menasha, WI (US); Kelly D. Farmer, Neenah, WI (US); Jason K. Sieck, Neenah, WI (US); Joseph D. Coenen, Kaukauna, WI (US); Jerry L. Hameister, Neenah, WI (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 8 days.

(21) Appl. No.: 17/047,212

(22) PCT Filed: Apr. 19, 2019

(86) PCT No.: PCT/US2019/028308
§ 371 (c)(1),
(2) Date: Oct. 13, 2020

(87) PCT Pub. No.: WO2019/212767
PCT Pub. Date: Nov. 7, 2019

(65) Prior Publication Data
US 2021/0162676 A1   Jun. 3, 2021

Related U.S. Application Data

(60) Provisional application No. 62/664,540, filed on Apr. 30, 2018.

(51) Int. Cl.
*B29C 65/08* (2006.01)
*B29C 65/78* (2006.01)
(Continued)

(52) U.S. Cl.
CPC .......... *B29C 65/085* (2013.01); *B29C 65/087* (2013.01); *B29C 65/7885* (2013.01);
(Continued)

(58) Field of Classification Search
USPC ....................................................... 156/73.1
See application file for complete search history.

(56) References Cited

U.S. PATENT DOCUMENTS

| 4,190,010 A | 2/1980 | Bibby |
| 4,457,243 A | 7/1984 | Bowditch |
(Continued)

FOREIGN PATENT DOCUMENTS

| EP | 0320989 B2 | 1/2001 |
| EP | 2886089 A1 | 6/2015 |
(Continued)

*Primary Examiner* — James D Sells
(74) *Attorney, Agent, or Firm* — Kimberly-Clark Worldwide, Inc.

(57) ABSTRACT

An energy apparatus can be configured for providing energy to an item being transferred over a rotatable drum. The energy apparatus can include a first energy mechanism configured to be fixedly coupled to the rotatable drum and rotate with the rotatable drum. The energy apparatus can also include a second energy mechanism configured to rotate around a circumference of the rotatable drum. The energy apparatus can additionally include a translation system coupled to the second energy mechanism and configured to move the second energy mechanism to an end position that allows the second energy mechanism and the first energy mechanism to provide energy to the item while there is no relative motion between the first energy mechanism and the second energy mechanism. Methods of providing energy to an item utilizing an energy apparatus are also disclosed.

20 Claims, 21 Drawing Sheets

(51) Int. Cl.
  *B29C 65/00* (2006.01)
  *B29L 31/48* (2006.01)
(52) U.S. Cl.
  CPC .......... *B29C 65/7894* (2013.01); *B29C 66/41* (2013.01); *B29C 66/7294* (2013.01); *B29C 66/73921* (2013.01); *B29C 66/81465* (2013.01); *B29C 66/8324* (2013.01); *B29C 66/83511* (2013.01); *B29C 66/83541* (2013.01); *B29L 2031/4878* (2013.01)

(56) References Cited

U.S. PATENT DOCUMENTS

| | | | |
|---|---|---|---|
| 4,670,073 A | 6/1987 | Langley | |
| 4,938,817 A | 7/1990 | Langley | |
| 5,238,170 A | 8/1993 | Nuss | |
| 5,246,433 A | 9/1993 | Hasse et al. | |
| 5,568,779 A | 10/1996 | Wong | |
| 5,569,234 A | 10/1996 | Buell et al. | |
| 5,643,396 A | 7/1997 | Rajala et al. | |
| 5,772,825 A | 6/1998 | Schmitz | |
| 5,817,199 A * | 10/1998 | Brennecke | B29C 66/21 156/73.1 |
| 6,113,717 A | 9/2000 | Vogt et al. | |
| 6,368,437 B1 | 4/2002 | Ziegelhoffer et al. | |
| 6,450,393 B1 | 9/2002 | Doumanidis et al. | |
| 6,454,752 B1 | 9/2002 | Huang et al. | |
| 6,579,275 B1 | 6/2003 | Pozniak et al. | |
| 7,722,591 B2 | 5/2010 | Bäck | |
| 7,959,619 B2 | 6/2011 | Cartier et al. | |
| 8,029,631 B2 | 10/2011 | Cartier et al. | |
| 8,197,458 B2 | 6/2012 | Bäck | |
| 9,289,329 B1 | 3/2016 | Schaap | |
| 9,655,786 B2 | 5/2017 | Piantoni et al. | |
| 9,993,370 B2 | 6/2018 | Fujita et al. | |
| 2002/0005257 A1 | 1/2002 | Tomsovic et al. | |
| 2003/0000620 A1 | 1/2003 | Herrin et al. | |
| 2003/0075258 A1 | 4/2003 | Zhang et al. | |
| 2003/0120252 A1 | 6/2003 | Franke et al. | |
| 2003/0126673 A1 | 7/2003 | Yardley | |
| 2005/0133144 A1 | 6/2005 | You et al. | |
| 2005/0230026 A1 | 10/2005 | Kramer | |
| 2007/0251643 A1 | 11/2007 | Umebayashi et al. | |
| 2008/0114325 A1 | 5/2008 | Edwall et al. | |
| 2009/0061151 A1 | 3/2009 | LaFond et al. | |
| 2009/0088713 A1 | 4/2009 | Norrby | |
| 2009/0204093 A1 | 8/2009 | Vasic et al. | |
| 2010/0063468 A1 | 3/2010 | Lehto et al. | |
| 2010/0268183 A1 | 10/2010 | Een et al. | |
| 2011/0173796 A1 | 7/2011 | Lavon et al. | |
| 2011/0174432 A1 | 7/2011 | LaVon et al. | |
| 2011/0297294 A1 | 12/2011 | McCabe | |
| 2012/0065043 A1 | 3/2012 | Lam et al. | |
| 2012/0088646 A1 | 4/2012 | Berggren et al. | |
| 2012/0157281 A1 | 6/2012 | Schneider et al. | |
| 2012/0312491 A1 | 12/2012 | Jackels et al. | |
| 2013/0213547 A1 | 8/2013 | Schneider et al. | |
| 2014/0110053 A1 | 4/2014 | Ordway et al. | |
| 2014/0186579 A1 | 7/2014 | Botelho et al. | |
| 2015/0080820 A1 | 3/2015 | Fjeldsa | |
| 2015/0083309 A1 | 3/2015 | Long et al. | |
| 2015/0144251 A1 | 5/2015 | Schoultz et al. | |
| 2016/0107377 A1 | 4/2016 | Fujita et al. | |
| 2016/0120709 A1 | 5/2016 | Hamamoto et al. | |
| 2016/0332361 A1 | 11/2016 | Lupinetti et al. | |
| 2016/0354258 A1 | 12/2016 | Findley et al. | |
| 2018/0056601 A1 | 3/2018 | Rajala et al. | |

FOREIGN PATENT DOCUMENTS

| | | |
|---|---|---|
| EP | 3092994 B1 | 2/2019 |
| GB | 2016537 A | 9/1979 |
| GB | 2071564 A | 9/1981 |
| GB | 2134036 A1 | 8/1984 |
| WO | 06087224 A1 | 8/2006 |
| WO | 10110708 A1 | 9/2010 |
| WO | 15104879 A1 | 7/2015 |
| WO | 16112925 A1 | 7/2016 |
| WO | 16130049 A1 | 8/2016 |

* cited by examiner

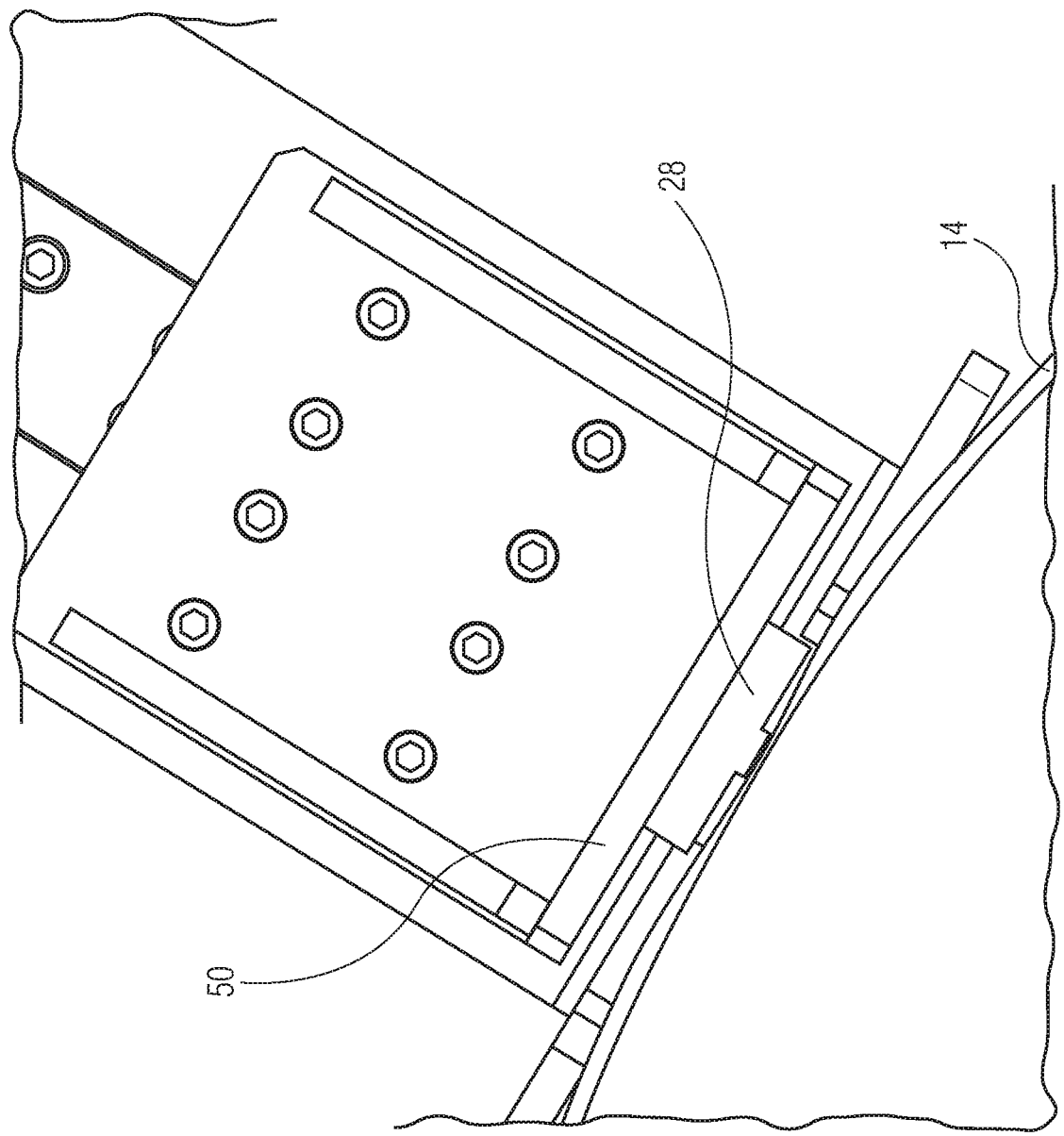

ENERGY APPARATUS AND METHODS OF PROVIDING ENERGY TO AN ITEM

TECHNICAL FIELD

The present disclosure relates to an energy apparatus and methods of providing energy to an item. More specifically, the present disclosure relates to an ultrasonic bonding apparatus and methods of utilizing the same.

BACKGROUND OF THE DISCLOSURE

Various manufacturing equipment and processes employ a variety of techniques to transfer energy to an item, which can be for accomplishing different tasks. Energy transfer mechanisms can include apparatuses configured for cutting, sealing, embossing, pressure bonding, and ultrasonic bonding, to name a few. In the manufacturing of some absorbent articles, ultrasonic bonding equipment is one energy transfer apparatus that can be utilized for providing an ultrasonic bond on one or more components of an absorbent article. As one example, some absorbent articles include side panels having a side seam bond that can be formed by transferring ultrasonic energy from respective components of an ultrasonic bonding apparatus commonly referred to as an anvil and an ultrasonic horn across the web of material forming the side panels.

While current ultrasonic bonding equipment can provide sufficient bonds in some absorbent article configurations and manufacturing process conditions, increases in manufacturing speeds and/or absorbent article configuration can produce less than desirable bond strength in the material being bonded together. For example, some ultrasonic bonding equipment does not provide sufficient dwell time for the ultrasonic horn and anvil to provide energy to the material in which an ultrasonic bond is desired. Additionally, past ultrasonic bonding apparatuses that sought to increase the dwell time between the ultrasonic horn and anvil involve complicated systems with multiple components to move and/or manipulate the material that is to be bonded.

Thus, there is a desire for an improved energy apparatus and methods of providing energy to an item. More particularly, there is a desire for an improved ultrasonic bonding apparatus and methods of providing ultrasonic energy to an item.

SUMMARY OF THE DISCLOSURE

In one embodiment, an energy apparatus can be configured for providing energy to an item being transferred over a rotatable drum. The energy apparatus can include a first energy mechanism configured to be fixedly coupled to the rotatable drum and rotate with the rotatable drum. The energy apparatus can further include a second energy mechanism configured to rotate around a circumference of the rotatable drum. The energy apparatus can also include a translation system coupled to the second energy mechanism and configured to move the second energy mechanism to an end position that allows the second energy mechanism and the first energy mechanism to provide energy to the item while there is no relative motion between the first energy mechanism and the second energy mechanism.

In another embodiment, an energy apparatus can be configured for providing energy to a web being transferred over a rotatable drum. The energy apparatus can include a first energy mechanism configured to be coupled to the rotatable drum and rotate with the rotatable drum. The energy apparatus can also include a second energy mechanism configured to rotate around a circumference of the rotatable drum. The second energy mechanism can be configured to be selectively rotated around the rotatable drum in at least two condition settings. The at least two condition settings can include a run condition setting and a thread-up condition setting. The run condition setting can be configured to allow the second energy mechanism to move in an axial direction parallel to a longitudinal axis of the rotatable drum and a radial direction being radial with respect to a center point of the circumference of the rotatable drum between a run condition setting start position and a run condition setting end position. The thread-up condition setting can be configured to allow the second energy mechanism to move in the axial direction and the radial direction between a thread-up condition setting start position and a thread-up condition setting end position. A radial gap between the second energy mechanism and the rotatable drum at the thread-up condition setting end position can be greater than a radial gap between the second energy mechanism and the rotatable drum at the run condition setting end position.

In yet another embodiment, a method for providing energy to an item is provided. The method can include transferring the item in a machine direction towards a rotatable drum. The method can also include rotating the rotatable drum. The method can further include providing an energy apparatus that includes a first energy mechanism, a second energy mechanism and a translation system. The first energy mechanism can be coupled to the rotatable drum and rotate with the rotatable drum. The second energy mechanism can rotate around a circumference of the rotatable drum. The translation system can be coupled to the second energy mechanism and can be configured to move the second energy mechanism in a run condition setting between a run condition setting start position and a run condition setting end position. The method can include engaging the item with the rotatable drum. The method can additionally include transferring the item on the outer circumference of the rotatable drum. Also, the method can include moving the second energy mechanism from the run condition setting start position to the run condition setting end position. Further, the method can include rotating the second energy mechanism in the run condition setting end position around the rotatable drum with no relative movement with respect to the first energy mechanism. The method can also include providing energy to the item when the second energy mechanism is in the run condition setting end position and rotating around the rotatable drum with no relative movement with respect to the first energy mechanism.

BRIEF DESCRIPTION OF DRAWINGS

A full and enabling disclosure thereof, directed to one of ordinary skill in the art, is set forth more particularly in the remainder of the specification, which makes reference to the appended figures in which:

FIG. 9C is a detailed view taken from FIG. 9A.

Figure 1:
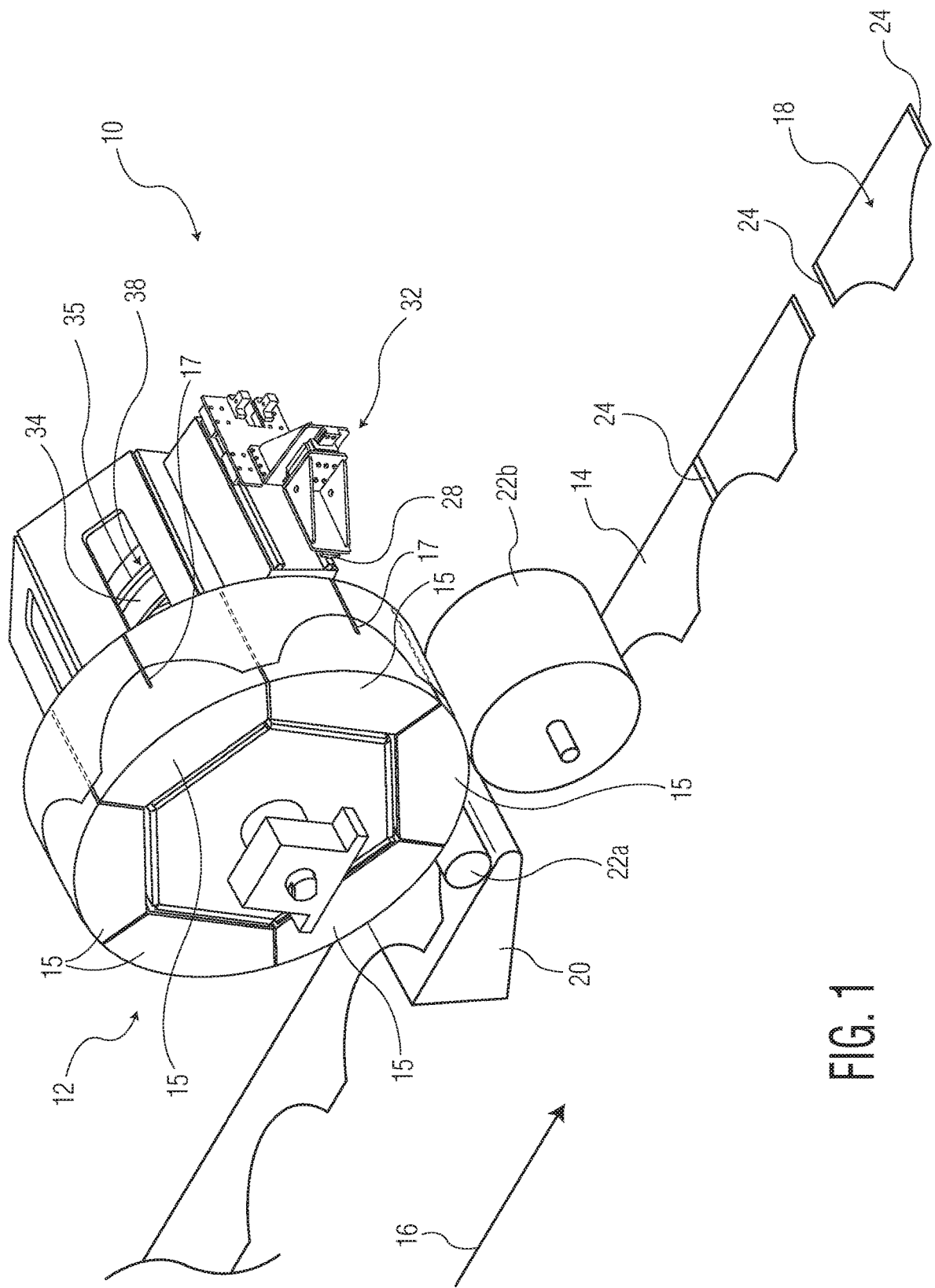
FIG. 1 is a perspective view of a preferred embodiment of an energy apparatus of the present disclosure, with some of the features of the energy apparatus being removed for purposes of clarity.

Repeat use of reference characters in the present specification and drawings is intended to represent the same or analogous features or elements of the disclosure.

DETAILED DESCRIPTION OF THE DISCLOSURE

In an embodiment, the present disclosure is generally directed towards an energy apparatus 10 for providing energy to an item 14. In one preferred embodiment, the energy apparatus 10 can provide ultrasonic energy for ultrasonically bonding an item 14. It is contemplated, however, that the energy apparatus 10 can provide different forms of energy to an item 14 to provide other mechanisms other than ultrasonic bonding including, but not limited to, thermal energy transfer for heat sealing, embossing, and cutting. The energy apparatus 10 can be utilized in various manufacturing environments and on various items. In one preferred embodiment, the energy apparatus 10 herein is discussed with respect to providing an ultrasonic bond on a component of an absorbent article 18, such as a cross-directional pant ("CD pant") when the absorbent article 18 is still in the form of a web 14 of interconnected absorbent articles 18. It is to be appreciated that the energy apparatus 10 can be utilized on other manufactured consumer goods, including, but not limited to, other personal care articles, consumer goods, and packaging.

Each example is provided by way of explanation and is not meant as a limitation. For example, features illustrated or described as part of one embodiment or figure can be used on another embodiment or figure to yield yet another embodiment. It is intended that the present disclosure include such modifications and variations. When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements. As used herein, the terminology of "first," "second," "third", etc. does not designate a specified order or that items referred to using such terms must be present sequentially, but is used as a means to differentiate between different features being described in the present disclosure. Many modifications and variations of the present disclosure can be made without departing from the spirit and scope thereof. Therefore, the exemplary embodiments described above should not be used to limit the scope of the invention.

Definitions

The term "absorbent article" refers herein to an article which may be placed against or in proximity to the body (i.e., contiguous with the body) of the wearer to absorb and contain various liquid, solid, and semi-solid exudates discharged from the body. Such absorbent articles, as described herein, are intended to be discarded after a limited period of use instead of being laundered or otherwise restored for reuse. It is to be understood that the present disclosure is applicable to various disposable absorbent articles, including, but not limited to, diapers, diaper pants, training pants, youth pants, swim pants, feminine hygiene products, including, but not limited to, menstrual pads or pants, incontinence products, including, but not limited to, adult fecal incontinence garments, medical garments, surgical pads and bandages, other personal care or health care garments, and the like without departing from the scope of the present disclosure.

The term "bonded" or "coupled" refers herein to the joining, adhering, connecting, attaching, or the like, of two elements. Two elements will be considered bonded or coupled together when they are joined, adhered, connected, attached, or the like, directly to one another or indirectly to one another, such as when each is directly bonded to intermediate elements. The bonding or coupling of one element to another can occur via continuous or intermittent bonds.

The term "film" refers herein to a thermoplastic film made using an extrusion and/or forming process, such as a cast film or blown film extrusion process. The term includes apertured films, slit films, and other porous films which constitute liquid transfer films, as well as films which do not transfer fluids, such as, but not limited to, barrier films, filled films, breathable films, and oriented films.

The term "meltblown" refers herein to fibers formed by extruding a molten thermoplastic material through a plurality of fine, usually circular, die capillaries as molten threads or filaments into converging high velocity heated gas (e.g., air) streams which attenuate the filaments of molten thermoplastic material to reduce their diameter, which can be a microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin et al., which is incorporated herein by reference. Meltblown fibers are microfibers which may be continuous or discontinuous, are generally smaller than about 0.6 denier, and may be tacky and self-bonding when deposited onto a collecting surface.

The term "nonwoven" refers herein to materials and webs of material which are formed without the aid of a textile weaving or knitting process. The materials and webs of materials can have a structure of individual fibers, filaments, or threads (collectively referred to as "fibers") which can be interlaid, but not in an identifiable manner as in a knitted fabric. Nonwoven materials or webs can be formed from many processes such as, but not limited to, meltblowing processes, spunbonding processes, carded web processes, etc.

The term "spunbond" refers herein to small diameter fibers which are formed by extruding molten thermoplastic material as filaments from a plurality of fine capillaries of a spinnerette having a circular or other configuration, with the diameter of the extruded filaments then being rapidly reduced by a conventional process such as, for example, eductive drawing, and processes that are described in U.S. Pat. No. 4,340,563 to Appel et al., U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartmann, U.S. Pat. No. 3,502,538 to Peterson, and U.S. Pat. No. 3,542,615 to Dobo et al., each of which is incorporated herein in its entirety by reference. Spunbond fibers are generally continuous and often have average deniers larger than about 0.3, and in an embodiment, between about 0.6, 5 and 10 and about 15, 20 and 40. Spunbond fibers are generally not tacky when they are deposited on a collecting surface.

Referring to FIGS. 1-5, an energy apparatus 10 configured for providing energy to an item being transferred over a rotatable drum 12 is shown. In the embodiment described herein, the energy apparatus 10 is configured to provide ultrasonic energy to a web 14 being transferred in a machine direction 16 that is a layered assembly of various non-woven materials, film, cellulosic and superabsorbent materials, which after being cut, will form discrete absorbent articles 18 after transferring beyond the rotatable drum 12. In some embodiments, the web 14 can include a laminate of spunbond-meltblown-spunbond ("SMS") material and elastics (e.g., strands or sheets). The web 14 can be transferred to the rotatable drum 12 and removed from the rotatable drum 12 with known web handling equipment and processes, including, but not limited to conveyors 20 and rollers 22a, 22b. In one embodiment, the energy apparatus 10 can be configured to provide an ultrasonic bond to form a side seam 24 on each side of an absorbent article 18, such as shown in FIG. 1. For clarity of other components of the energy apparatus 10 as described herein, the web 14 is removed from its position over the rotatable drum 12 in FIG. 2 and is only shown in an upstream position prior to engaging the rotatable drum 12 and a downstream position after disengaging from the rotatable drum 12 in FIG. 2. In the embodiment described herein, the energy apparatus 10 can form the side seam 24 on the web 14 before the web 14 is cut into discrete absorbent articles 18, however, it is contemplated that the energy apparatus 10 can be configured to provide energy to discrete items, such as absorbent articles 18, as well.

Figure 2:
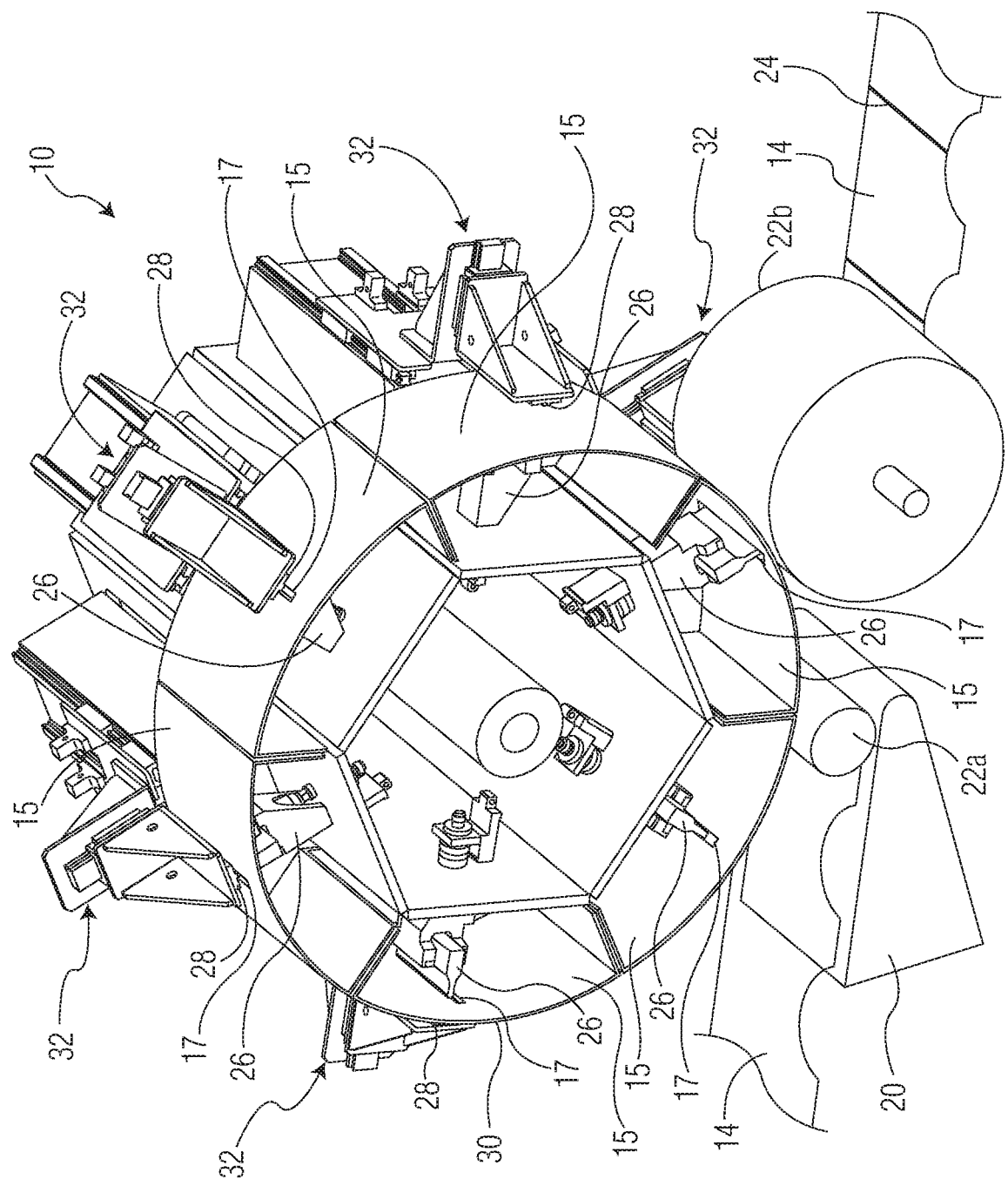
FIG. 2 is a perspective view of the energy apparatus of FIG. 1 with the front side of the rotatable drum being removed to depict pairs of first and second energy mechanisms.
Figure 3:
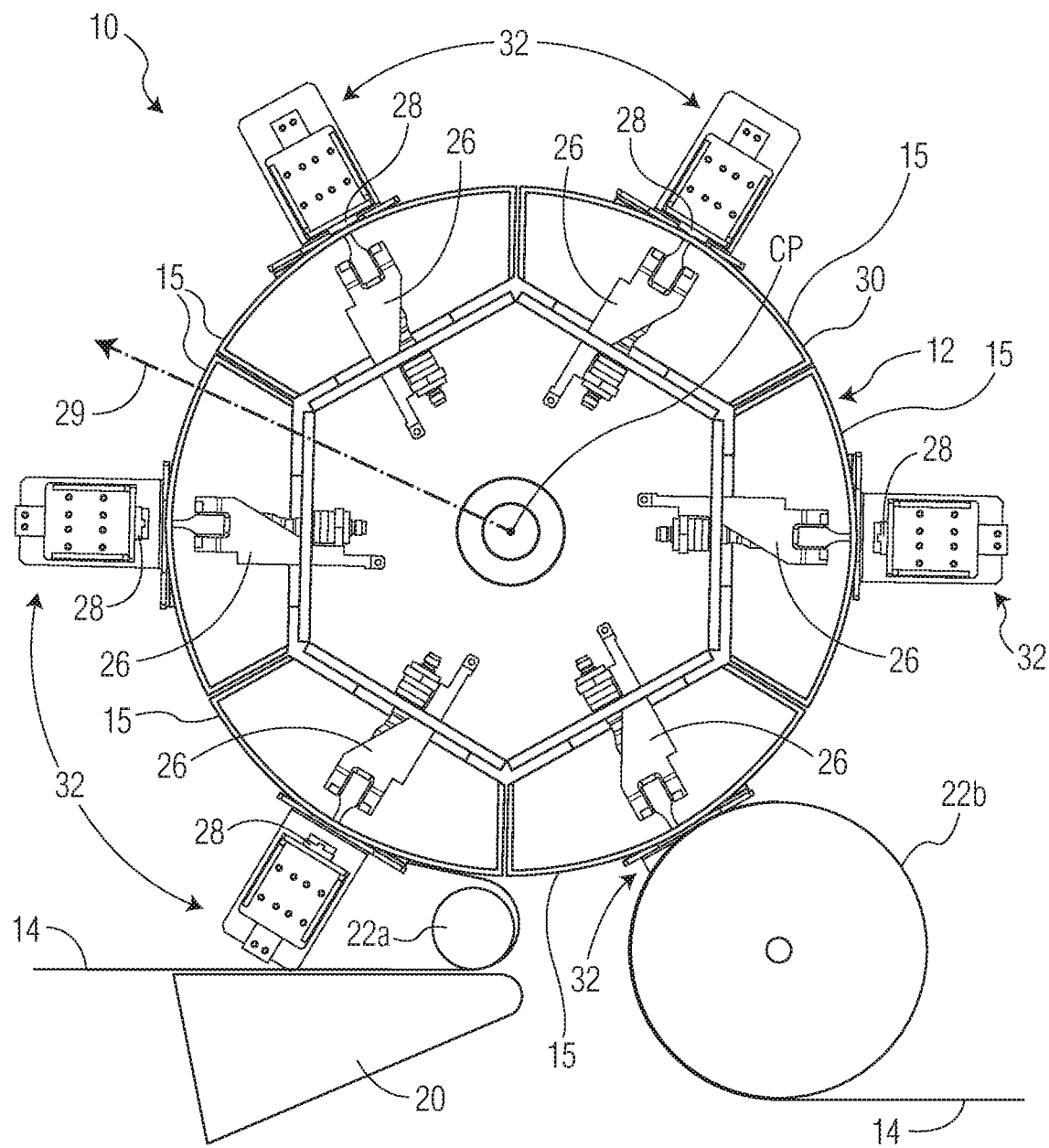
FIG. 3 is a front plan view of the energy apparatus of FIG. 2.

The energy apparatus 10 can include a first energy mechanism 26 and a second energy mechanism 28. The first energy mechanism 26 can be configured to be mounted inside of the rotatable drum 12, and as such, is not visible in FIG. 1. However, FIGS. 2-5 depict several first energy mechanisms 26. As shown in the embodiment depicted in FIGS. 2-5, the energy apparatus 10 can include more than one first energy mechanism 26 and more than one second energy mechanism 28. In some embodiments, the energy apparatus 10 can include two, three, four, five, six, or more pairs of first and second energy mechanisms 26, 28. For example, as shown in FIGS. 2 and 3, the energy apparatus 10 can include six pairs of first and second energy mechanisms 26, 28 (it is to be noted that only one second energy mechanism 28 is depicted in FIG. 1, for purposes of clarity). In such an embodiment, the rotatable drum 12 can be configured to include a shell 15 for each pair of first and second energy mechanisms 26, 28. As will be described in further detail below, each shell 15 can include a slot 17 (labeled in FIGS. 1 and 2) allowing for the respective first and second energy mechanism 28 to provide energy to the web 14. For discussion throughout, any reference to a single first energy mechanism 26 or a single second energy mechanism 28 is to be intended to refer to all of such energy mechanisms 26, 28 present in an embodiment, unless otherwise noted.

The first energy mechanism 26 can be configured to be fixedly coupled to the rotatable drum 12 and rotate with the rotatable drum 12. In other words, the first energy mechanism 26 can be configured to rotate with the rotatable drum 12, but remain stationary in the axial direction 27 and the radial direction 29. As depicted in FIG. 2, the first energy mechanism 26 can be disposed within at least a portion of a shell 15 of the rotatable drum 12. The second energy mechanism 28 can be configured to rotate around a circumference 30, or outer surface, of the rotatable drum 12 as will be described in more detail below. In the embodiment described herein where the energy apparatus 10 is configured to provide ultrasonic energy to the web 14, the first energy mechanism(s) 26 can be an ultrasonic horn and the second energy mechanism(s) 28 can be configured to be an anvil. Of course, it is contemplated that in an alternative embodiment the energy apparatus 10 could be configured such that the first energy mechanism 26 that is fixedly coupled to the rotatable drum 12 inside of the circumference (outer surface) 30 of the drum 12 could be an anvil and the second energy mechanism 28 that is configured to rotate around a circumference 30 of the drum 12 could be an ultrasonic horn.

Figure 5:
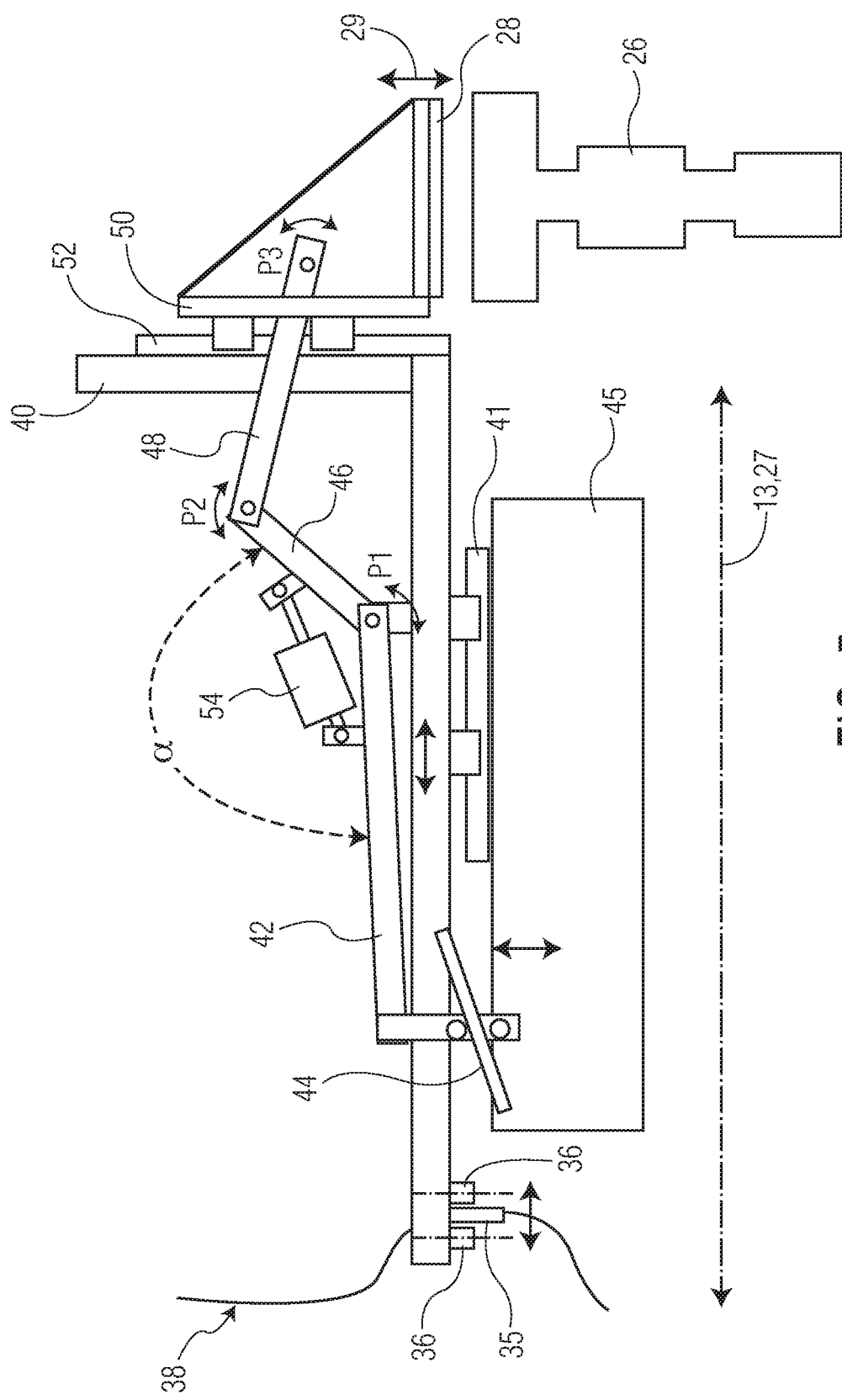
FIG. 5 is a side view of the second energy mechanism of the energy apparatus of FIG. 1 providing further detail of the components of the second energy mechanism.

As best illustrated in FIG. 5, the energy apparatus 10 can also include a translation system 32. As will be described in further detail below with respect to FIGS. 6A-10B, the translation system 32 can be configured to move the second energy mechanism 28 to a run condition setting end position that allows the second energy mechanism 28 and the first energy mechanism 26 to provide energy to the item 14 while there is no relative motion between the first energy mechanism 26 and the second energy mechanism 28. The translation system 32 can be configured to move the second energy mechanism 28 in both an axial direction 27 and a radial direction 29. The axial direction 27 is parallel to a longitudinal axis 13 of the rotatable drum 12. The radial direction 29 is in a direction that is radial with respect to a center point CP (labeled in FIG. 3) of the rotatable drum 12. It is contemplated that the translation system 32 can be configured in various ways to move the second energy mechanism 28 in an axial direction 27 and the radial direction 29, however, one preferred embodiment is depicted in the figures herein and is described below.

Figure 4:
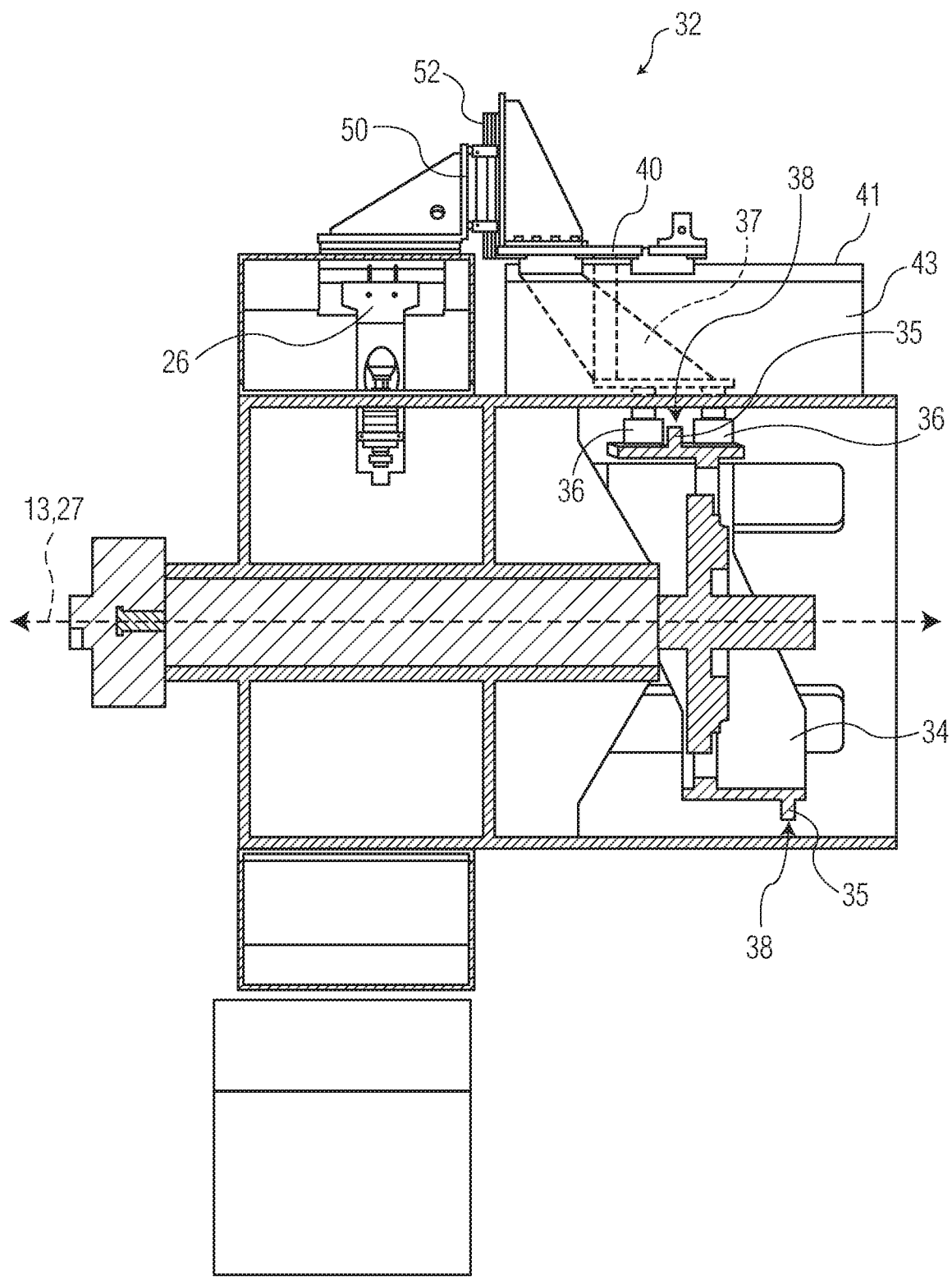
FIG. 4 is a cross-sectional view of the energy apparatus of FIG. 3 showing a single pair of a first energy mechanism and a second energy mechanism.

In one preferred embodiment, the translation system 32 can include a first drive-side cam 34 (depicted in FIGS. 1, 4, and 5) and at least one cam follower 36, which is depicted in FIG. 4 and schematically in FIG. 5. The cam follower 36 can be configured to travel a path 38 provided by the first drive-side cam 34. As illustrated in FIGS. 1 and 4, in a preferred embodiment the first drive-side cam 34 can be a rib cam, and thus, the path 38 can be provided by a rib 35 that encircles the first drive-side cam 34. It is contemplated that the first drive-side cam 34 can be in the form of other types of cams, such as, but not limited to, a barrel cam.

The translation system 32 can also include a sled 40. As illustrated in FIG. 4 and shown schematically in FIG. 5, the sled 40 can be coupled to the cam follower 36 through connecting frame 37 and can be coupled to the second energy mechanism 28. The rib 35 provides a path 38 that varies in axial position depending on its circumferential position, and thus, can help provide the axial movement of the second energy mechanism 28. As shown in FIGS. 4 and 5, the sled 40 can be configured to move axially along rails 41 mounted on a housing 43.

Further components of the translation system 32 are depicted in FIG. 5. The translation system 32 can additionally include a second drive-side cam 44 (shown schematically in FIG. 5). The translation system 32 can also include a first connecting link 42 that can be coupled to a second cam follower 45 and to the sled 40. The second cam follower 45 can follow along a path provided by the second drive-side cam 44. The translation system 32 can also include a second connecting link 46 that can be coupled to the first connecting link 42. The translation system 32 can further include a third connecting link 48 that can be coupled to the second connecting link 46 and to the second energy mechanism 28 by being coupled to a frame 50. As will be described further below, the second connecting link 46 can be configured to pivot about a first pivot point P1 and the third connecting link 48 can be configured to pivot about a second pivot point P2. The frame 50 can be configured to slide on rails 52 mounted to the sled 40 to provide for radial movement of the second energy mechanism 28.

The translation system 32 can also include an actuator 54. As depicted in FIG. 5, the actuator 54 can be coupled to the first connecting link 42 and to the second connecting link 46. The actuator 54 can maintain a desired angle α between the first connecting link 42 and the second connecting link 46 during the run condition setting of the energy apparatus 10. As will be described in further detail below, the actuator 54 can be selectively retractable to pivot the second connecting link 46 about the first pivot point P1 and to pivot the third connecting link 48 about the second pivot point P2 between the second connecting link 46 and the third connecting link 48 to assist in raising the second energy mechanism 28 in the radial direction 29 when the energy apparatus 10 is desired to run in the thread-up condition setting.

The functioning of the energy apparatus 10 in a run condition setting will now be described with respect to FIGS. 6A-10B. For purposes of clarity, FIGS. 6A-10B only depict one second energy mechanism 28 of the embodiment of the energy apparatus 10 of FIGS. 1-5 that includes six pairs of first and second energy mechanisms 26, 28. The associated first energy mechanism 26 is disposed within the rotatable drum 12, as shown in FIGS. 2-4 and rotates with the rotatable drum 12. Although not depicted, the other additional pairs of first and second energy mechanisms 26, 28 of the energy apparatus 10 can be configured to function in the same manner and positioning with respect to the discussion below. Of course, and as previously stated, the energy apparatus 10 of the present disclosure can be configured to include one or more pairs of first and second energy mechanisms 26, 28, depending on various factors, including, but not limited to, manufacturing space, running speed of the item 14, diameter of the rotatable drum 12, dimensions of the item 14 (e.g., the pitch of the absorbent articles 18 forming web 14), and the desired amount of energy to be provided by the energy apparatus 10.

Figure 6A:
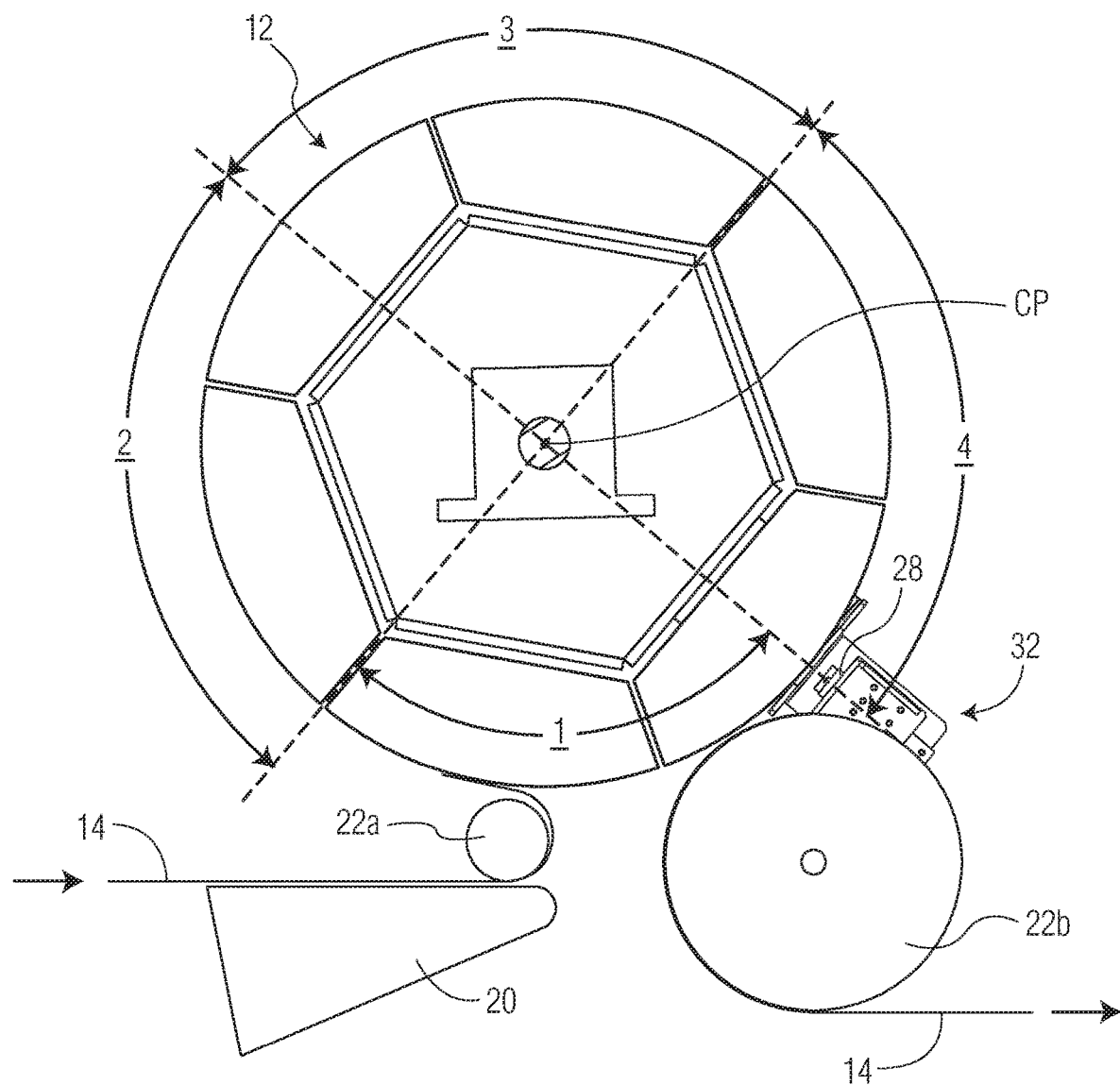
FIG. 6A is a front plan view showing the energy apparatus of FIG. 1, with the second energy mechanism in the beginning of the first phase of a run condition setting.

As illustrated in FIG. 6A, the energy apparatus 10 can be described as passing through four phases (Phases 1-4) during the run condition setting. FIG. 6A depicts the four phases as creating one full revolution that a first energy mechanism 26 (not visible in FIG. 6A) and a second energy mechanism 28 make around a center point CP of the rotatable drum 12. Although each phase is shown as occupying approximately $\frac{1}{4}^{th}$ of a revolution (or about 90°), the angular amount of each phase may vary depending on a variety of factors, including but not limited to, the speed of the item or web 14, the desired energy transfer being applied to the item or web 14, the diameter of the rotatable drum 12, the dimensions of the item or web 14 (e.g., the pitch of the absorbent articles 18 forming web 14), the location of the web as it engages with and disengages from the drum 12, and the location of surrounding equipment (such as rollers 22a, 22b) near the rotatable drum 12. In some embodiments, one or more phases of the four phases of the run condition setting may range from about 25° to about 200°, or more preferably from about 50° to about 150°. Thus, it is contemplated that one or more of the phases may utilize a greater or smaller amount of angular rotation around the rotatable drum 12 than other phase(s).

The first phase can occupy a portion of the rotation around the center point CP of the rotatable drum 12 that allows the web 14 to engage with and disengage from the rotatable drum 12 without interference from the second energy mechanism 28. As shown in FIG. 6A, the web 14 depicted in the embodiment illustrated travels from the left-side of the figure over conveyor 20 and roller 22a, engages with the rotatable drum 12, rotates with the rotatable drum 12 in a clock-wise fashion, and disengages from the rotatable drum 12 around the roller 22b.

Figure 6B:
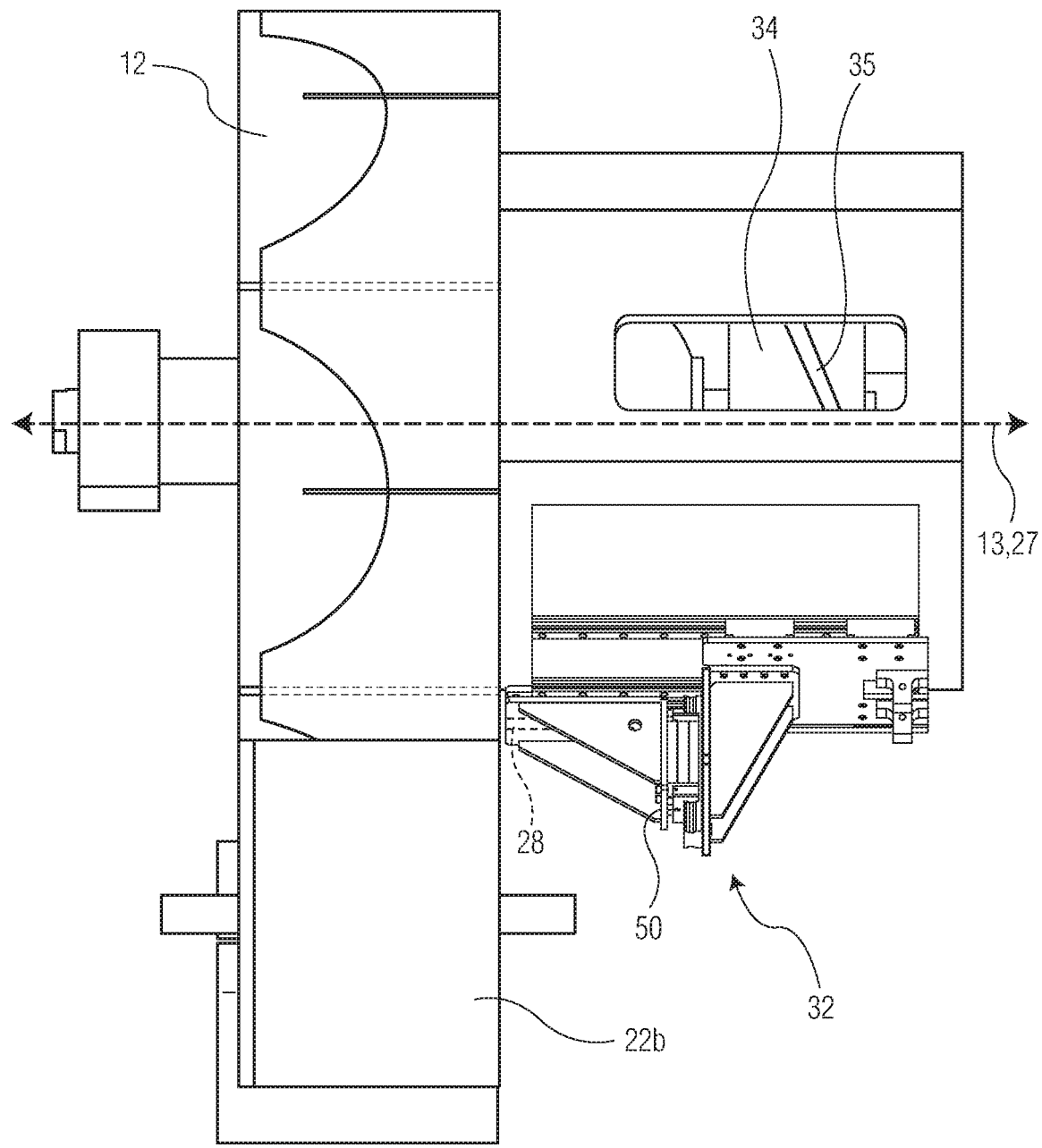
FIG. 6B is a side view showing the energy apparatus of FIG. 6A, as viewed from a downstream side of the rotatable drum.

The axial and radial positioning of the second energy mechanism 28 in phase 1 can be referred to as the run condition setting start position. As illustrated in FIG. 6B, which provides a side view showing the energy apparatus 10 of FIG. 6A as viewed from a downstream side of the rotatable drum 12, the second energy mechanism 28 is positioned by the translation system 32 such that the second energy mechanism 28 is axially displaced from the web 14, as well as roller 22b to allow clearance with the web 14 and roller 22b in the axial direction 27 as the second energy mechanism 28 rotates through phase 1. The translation system 32, as described above, allows for such movement in the axial direction 27 by the rib 35 on the first drive-side cam 34. As the cam follower 36 rotates around the rib 35 on the first drive-side cam 34, the path 38 of the rib 35 moves the cam follower 36 axially away from the web 14 on the rotatable drum 12. Because the second energy mechanism 28 is coupled to the sled 40, which in turn is coupled to the cam follower 36, the second energy mechanism 28 moves in a similar axial fashion away from the web 14. As also depicted in FIG. 6A, the second energy mechanism 28 can have a radial gap with the web 14 when positioned in the run condition setting start position. The axial and radial clearance of the second energy mechanism 28 from the web 14 allows the second energy mechanism 28 to rotate in a clock-wise fashion through phase 1 without interfering with the web 14, roller 22b, or roller 22a as the second energy mechanism 28 moves towards the position illustrated in FIG. 7A.

Figure 7A:
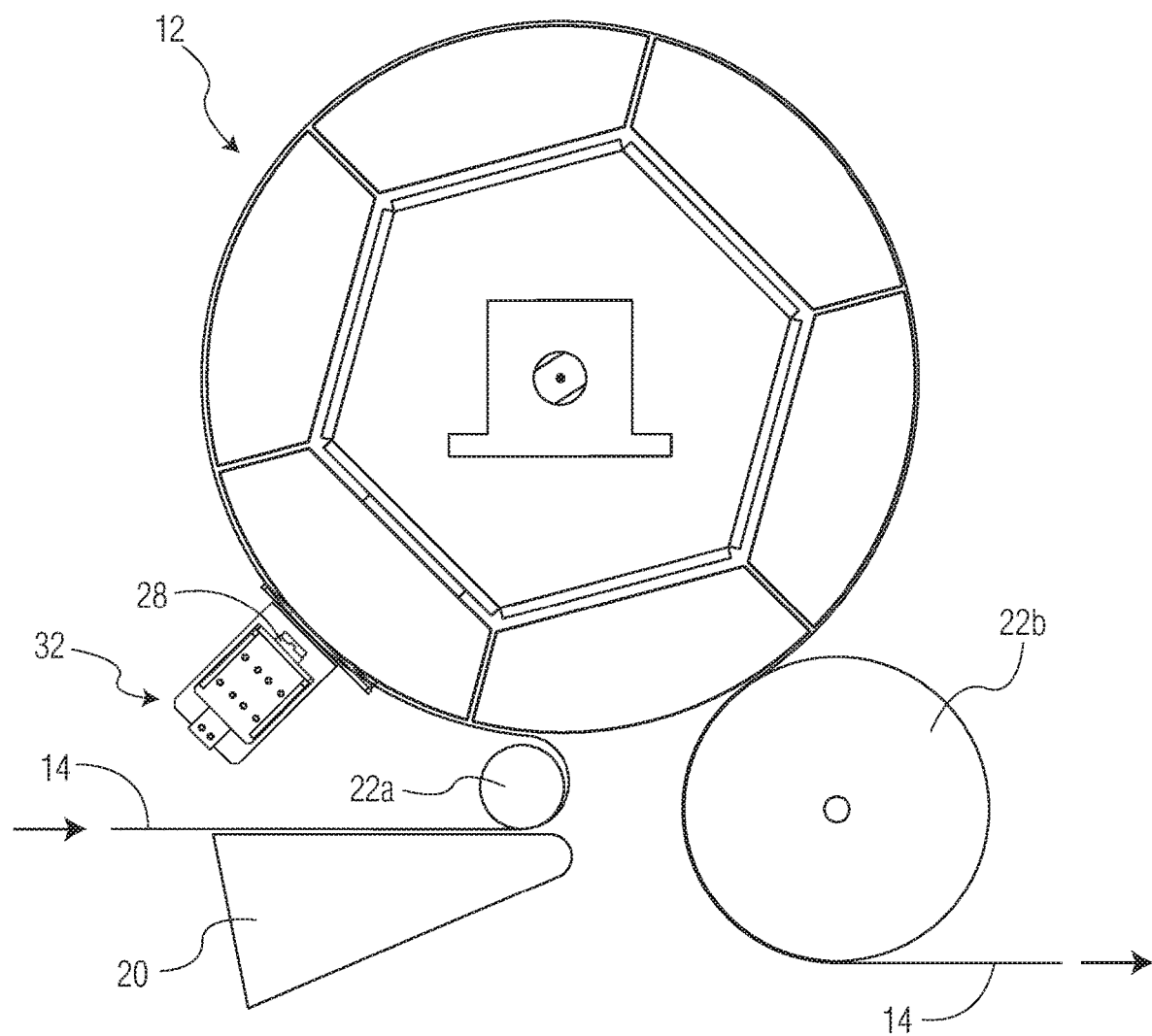
FIG. 7A is a front plan view showing the energy apparatus of FIG. 1, with the second energy mechanism near the end of the first phase of a run condition setting.
Figure 7B:
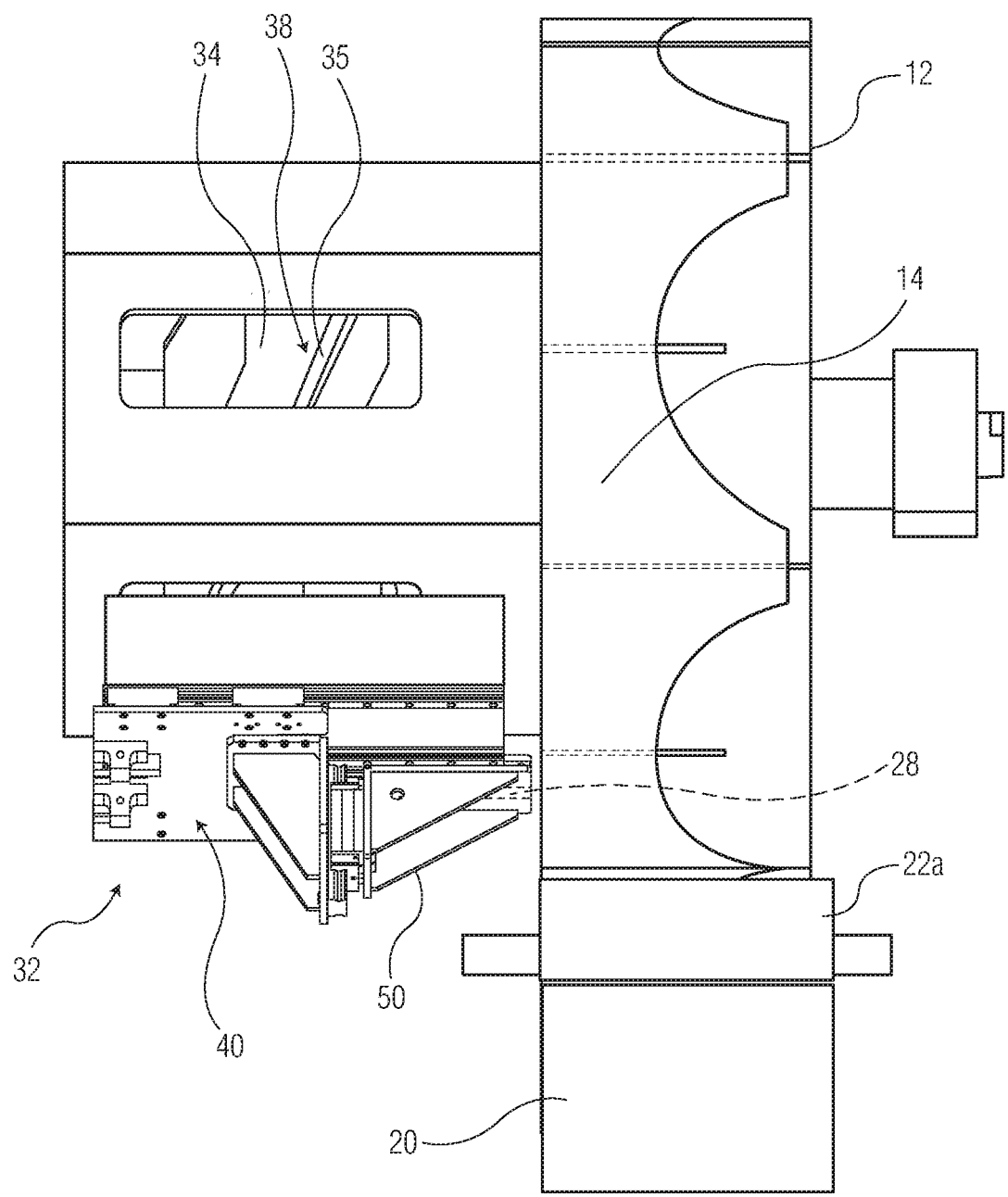
FIG. 7B is a side view showing the energy apparatus of FIG. 7A, as viewed from an upstream side of the rotatable drum.
Figure 7C:
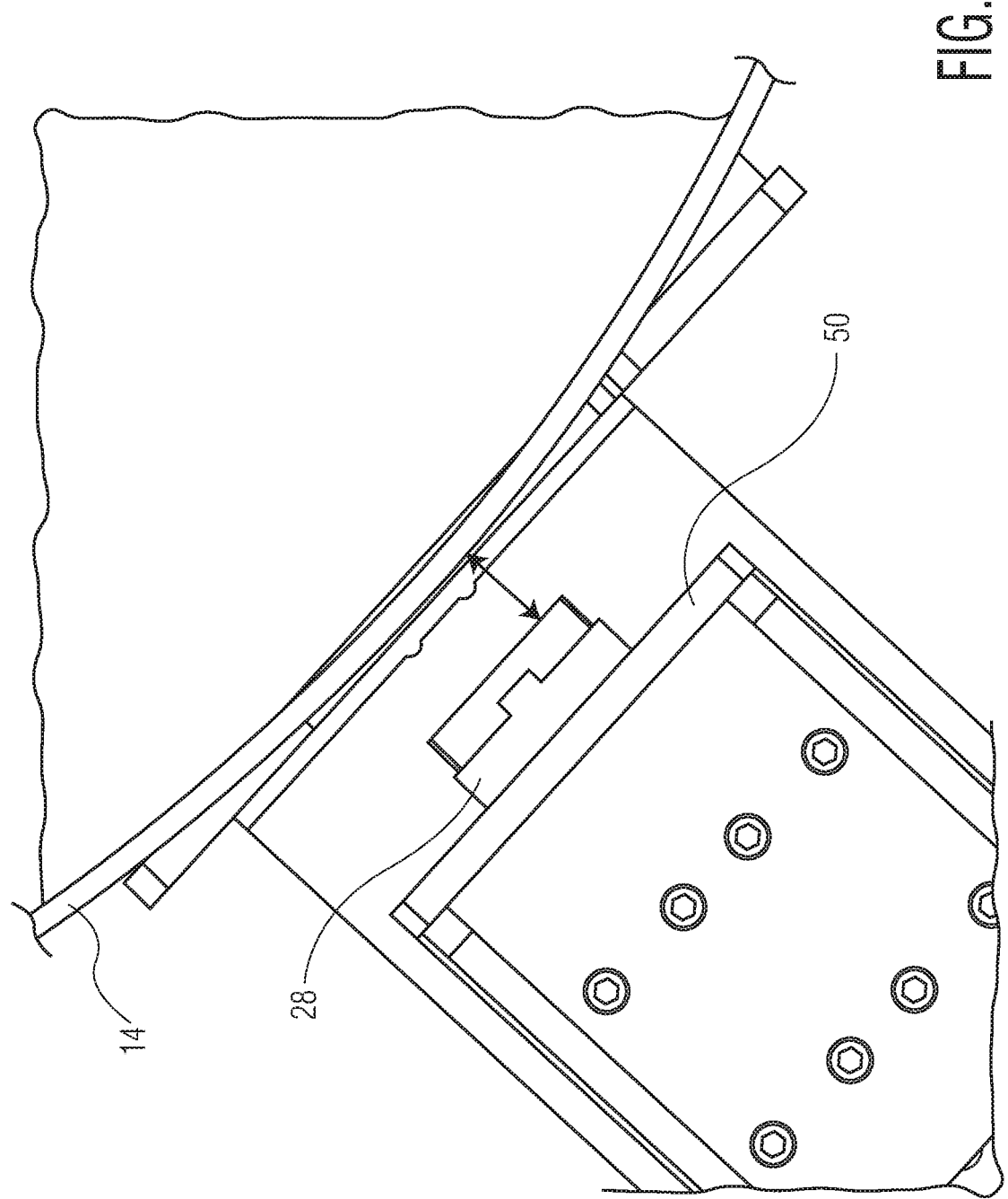
FIG. 7C is a detailed view taken from FIG. 7A.

FIG. 7A illustrates the second energy mechanism 28 as it moves towards the end of phase 1 of the run condition setting. FIG. 7B provides a side view showing the energy apparatus 10 of FIG. 7A, as viewed from an upstream side of the rotatable drum 12. As illustrated in FIG. 7B, the second energy mechanism 28, which is out of view but is coupled to the frame 50, is still axially displaced from the web 14. The path 38 (or profile) of the first drive-side cam 34 provides for this continued axial clearance of the second energy mechanism 28 as the second energy mechanism 28 moves through the first phase of the run condition setting. FIG. 7C provides a detailed view of the second energy mechanism 28 in its position from FIG. 7A and depicts that the second energy mechanism 28 includes a radial gap from the web 14, similar to its radial position in FIG. 6A.

Figure 8A:
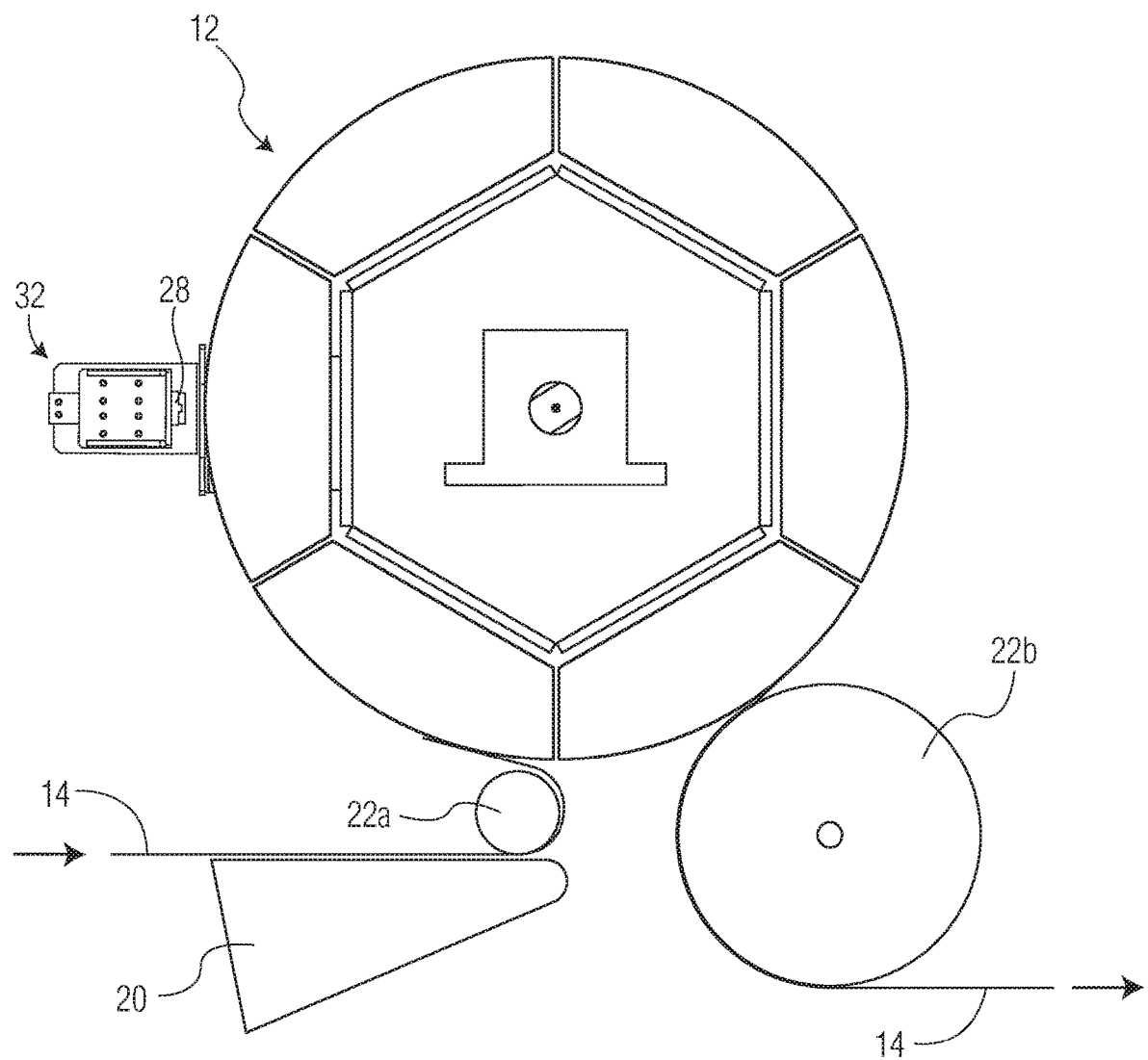
FIG. 8A is a front plan view showing the energy apparatus of FIG. 1, with the second energy mechanism in the second phase of a run condition setting.
Figure 8B:
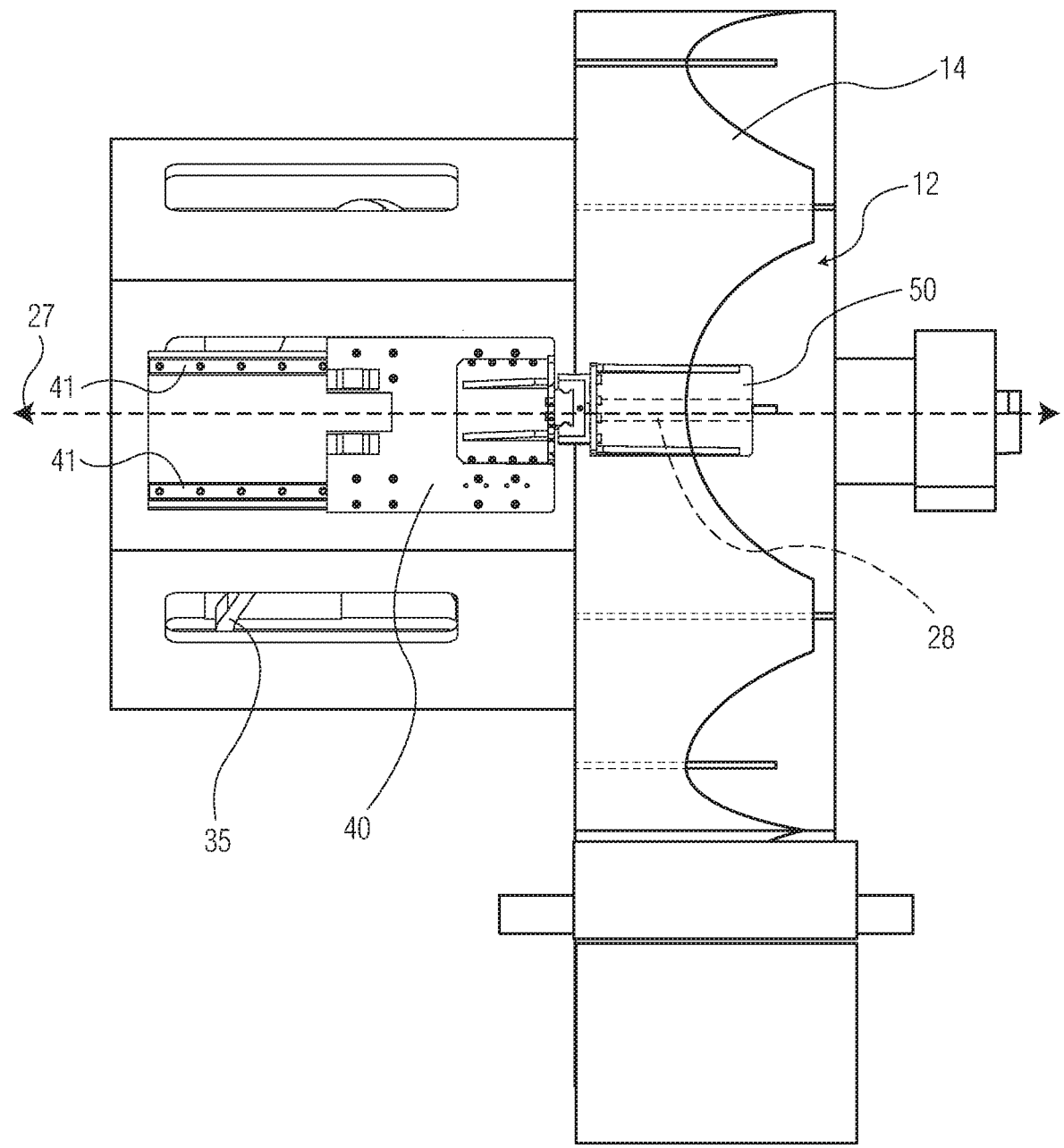
FIG. 8B is a side view showing the energy apparatus of FIG. 8A, as viewed from an upstream side of the rotatable drum.

FIG. 8A depicts the second energy mechanism 28 in phase 2 of the run condition setting. The second energy transfer mechanism 28 moves in an axial direction 27 such that it extends over the rotatable drum 12 and over the web 14 in the second phase of the run condition setting. FIG. 8B provides a side view showing the energy apparatus 10 of FIG. 8A, as viewed from an upstream side of the rotatable drum 12 and depicts the second energy mechanism 28 extending over the drum 12 and web 14. The cam follower 36 following the path 38 of the first drive-side cam 34 defined by the rib 35 provides for the axial movement of the sled 40 along rails 41, and in turn, the axial movement of the second energy mechanism 28 which is coupled to the sled 40. As depicted in FIG. 8A, in some embodiments the second energy mechanism 28 still can have a radial gap with the web 14 in the second phase of the run condition setting. In alternative embodiments, the energy apparatus 10 could be configured to move the second energy mechanism 28 in a radial direction 29 to reduce the radial gap between the second energy mechanism 28 and the web 14 in the second phase.

Figure 9A:
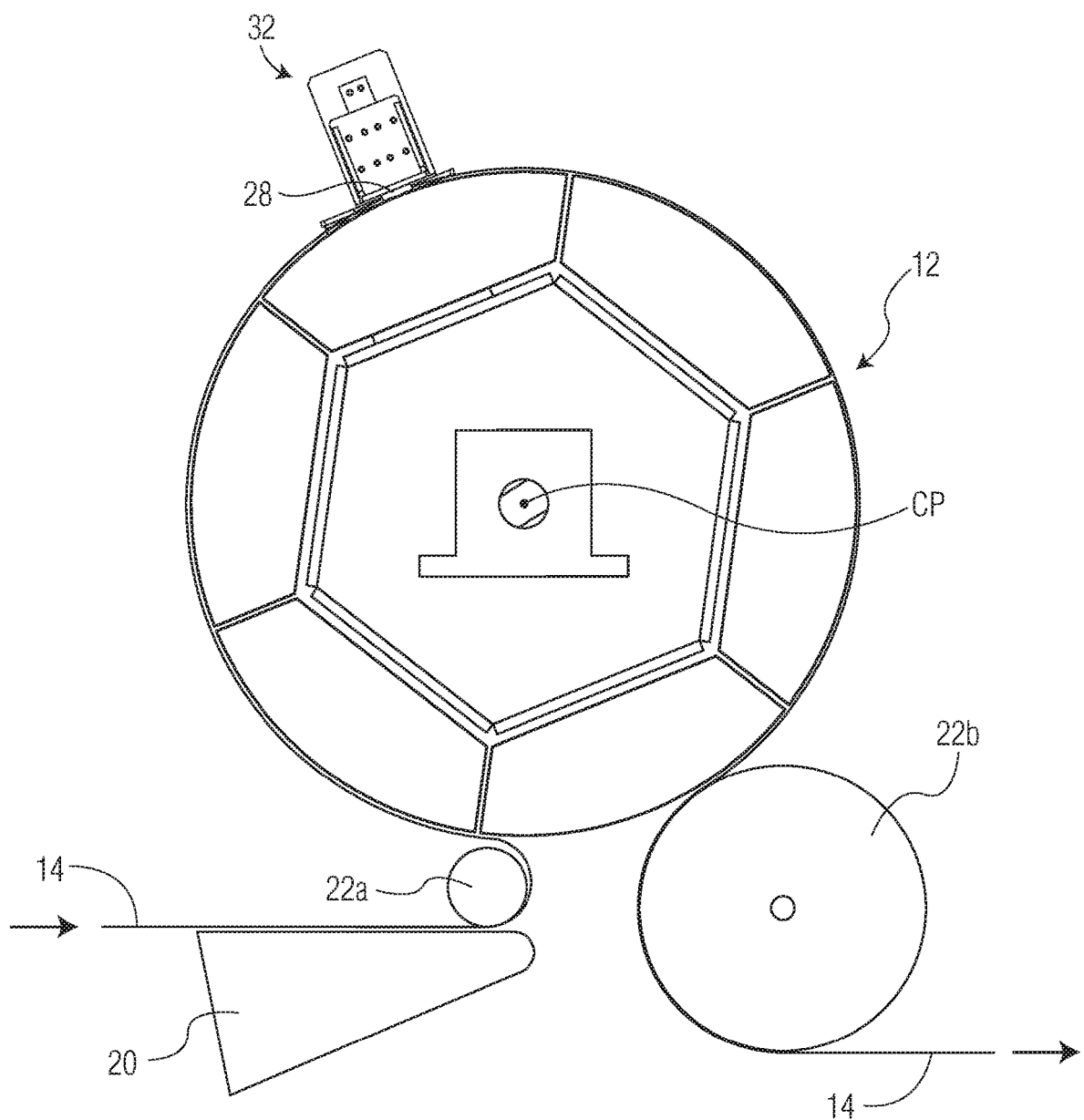
FIG. 9A is a front plan view showing the energy apparatus of FIG. 1, with the second energy mechanism being in the third phase of a run condition setting.
Figure 9B:
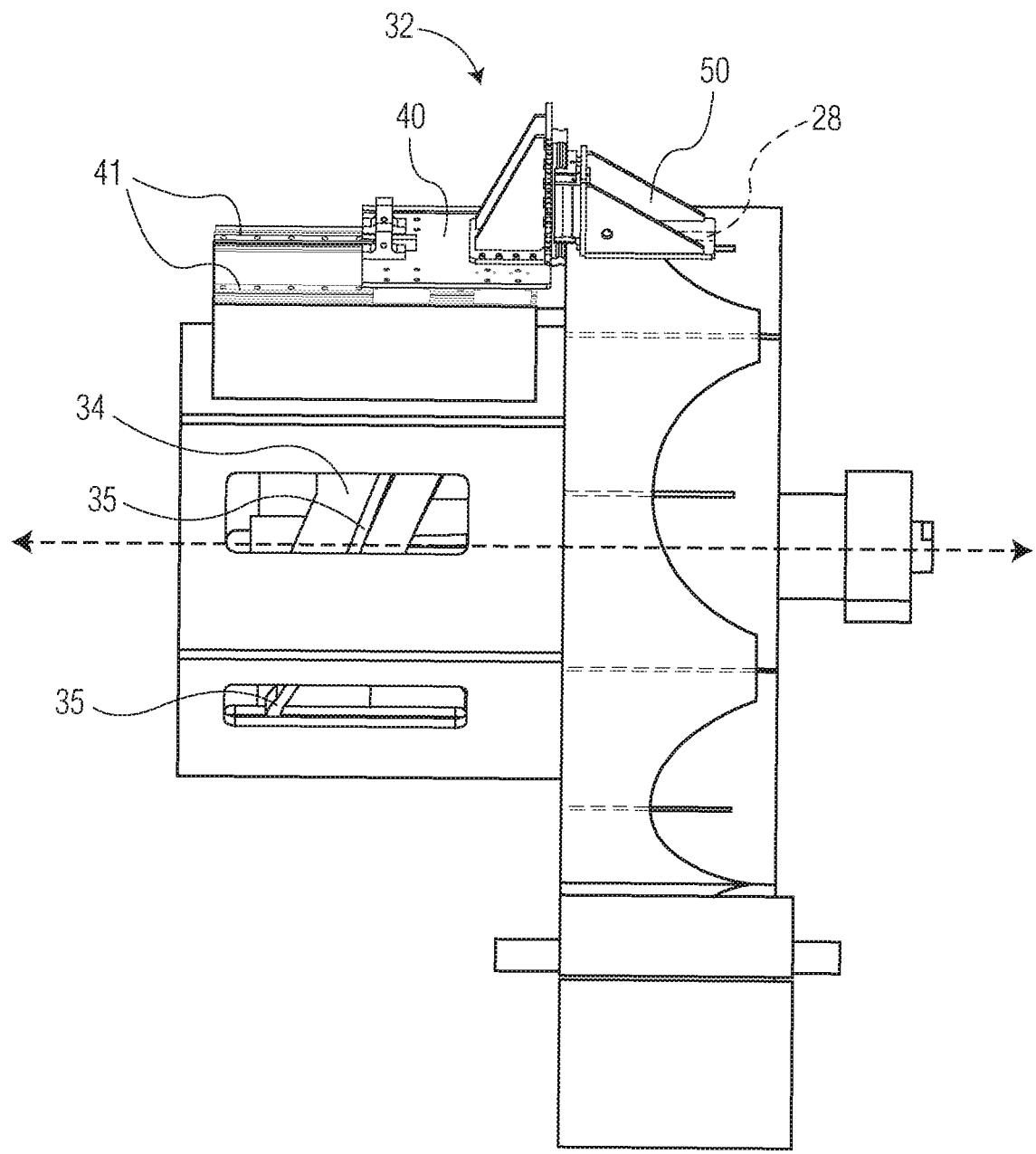
FIG. 9B is a side view showing the energy apparatus of FIG. 7A, as viewed from an upstream side of the rotatable drum.

As illustrated in FIGS. 9A-9C, as the second energy mechanism 28 continues to rotate around the center point CP of the rotatable drum 12, the second energy mechanism 28 enters phase 3 of the run condition setting. The third phase of the run condition setting can be the phase in which the first energy mechanism 26 and the second energy mechanism 28 provide energy to the item 14, such as the web 14. In the preferred embodiment being discussed herein, the first energy mechanism 26 and the second energy mechanism 28 provide ultrasonic energy to the web 14 to provide an ultrasonic bond to the web 14. As discussed in the second phase shown in FIGS. 8A and 8B, the second energy mechanism 28 can already be in position in the axial direction 27 for bonding in the third phase, as illustrated in FIG. 9B. However, as depicted in FIGS. 9A and 9C, in the third phase of the run condition setting the second energy mechanism 28 can reduce the radial gap between the second energy mechanism 28 and the web 14 by moving the second energy mechanism 28 closer to the web 14 on the rotatable drum 12, and in turn, closer to the first energy mechanism 26. The energy can be provided to the web 14 from the first and second energy mechanisms 26, 28 through a slot 17 in the shell 15 of the rotatable drum 12 depicted in FIGS. 1 and 2.

With reference to FIG. 5 and prior discussion of the translation system 32, the preferred embodiment as illustrated herein is configured to move the second energy mechanism 28 in a radial direction 29 through the second drive-side cam 44, the second cam follower 45, and the series of connecting links 42, 46, 48 coupling the second cam follower 45 to the second energy mechanism 28. As the second cam follower 45 follows the second drive-side cam 44, the first connecting link 42 and the second connecting link 46 can each pivot about the first pivot point P1, with the angle α between the first connecting link 42 and the second connecting link 46 being maintained by the actuator 54. As the second connecting link 46 pivots about the first pivot point P1, the third connecting link 48 can pivot about the second pivot point P2 to either raise or lower the frame 50 on the rails 52 mounted on the sled 40. The second energy mechanism 28 can be coupled to the frame 50, and thus, can be raised or lowered in the radial direction 29 with the frame 50.

In some embodiments, the second energy mechanism 28 can be configured to move in the radial direction 29 such that in the end position of the run condition setting the second energy mechanism 28 can have an interference fit with the first energy mechanism 26 to assist with the energy transfer between the first and second energy mechanisms 26, 28 and the web 14. In some embodiments, the second energy mechanism 28 can be configured to apply pressure against the first energy mechanism 26 in the end position of the run condition setting. In such an embodiment, the actuator 54 can provide a dampening effect for the energy apparatus 10. Of course, in some other embodiments, the second energy mechanism 28 can be configured to move in the radial direction 29 to an end position of the run condition setting and have some amount of radial clearance with the first energy mechanism 26 and still transfer energy to the web 14.

Once the second energy mechanism 28 is moved into the end position in phase three for the run condition setting, the second energy mechanism 28 continues to rotate at the same speed as the first energy mechanism 26, which itself is rotating with the rotatable drum 12, such that there is no relative movement between the first energy mechanism 26 and the second energy mechanism 28 when the two energy mechanisms 26, 28 are providing energy to the web 14. This matching of speeds and paired rotation can increase the amount of time that the energy can be provided to the web 14 (e.g., "dwell time"). In the embodiment described herein wherein the energy apparatus 10 is providing ultrasonic energy to the web 14, the increase in the amount of dwell time can lead to improved bond strength in the bond created in the web 14, and in turn, an improved product such as an absorbent article 18 with a side seam bond 24.

An additional benefit to the energy apparatus 10 as described herein is that the full length and width of the ultrasonic bond in the web 14 that is formed by a pair of the first energy mechanism 26 and the second energy mechanism 28 is formed for the entire dwell time. This can provide a more consistent bond with improved bond strength due to the increased dwell time.

Importantly, the energy apparatus 10 can be configured such that the second energy mechanism 28 is the component of the energy apparatus 10 that moves into radial position with respect to the first energy mechanism 26 for providing energy to the item 14, rather than moving the first energy mechanism 26 from within the rotatable drum 12 to the second energy mechanism 28. By configuring the second energy mechanism 28 to move radially and have the first energy mechanism 26 fixedly coupled to the rotatable drum 12 rather than radially moving the first energy mechanism 26, the item 14 (such as web 14) can remain in a fixed position relative to the circumference 30 of the rotatable drum 12. This provides improved handling characteristics of the item 14 that can reduce the chance that the manufacturing process may need to be shut down due to a jam or improper phasing of the item or web 14.

Figure 10A:
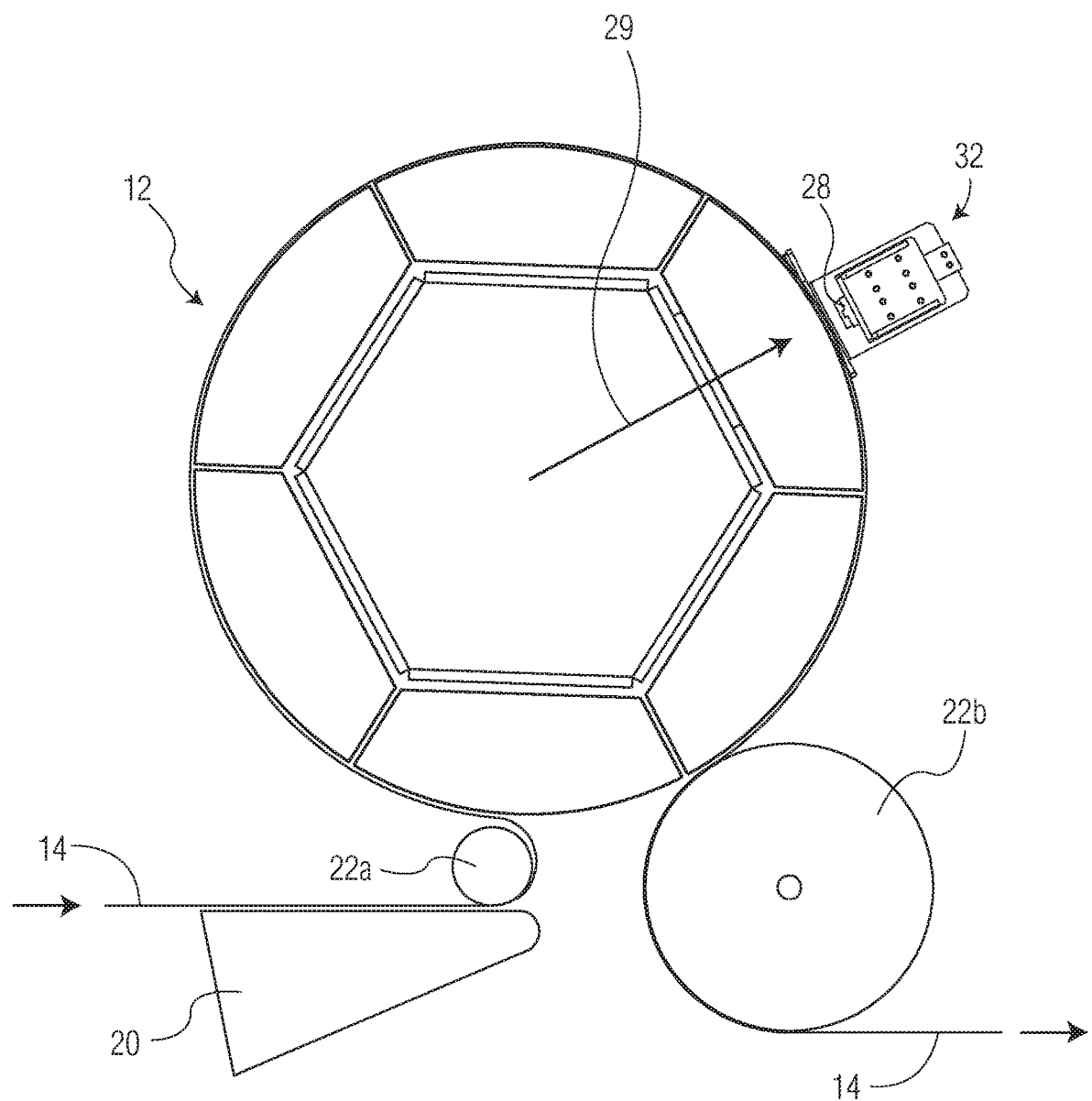
FIG. 10A is a front plan view showing the energy apparatus of FIG. 1, with the second energy mechanism in the fourth phase of a run condition setting.
Figure 10B:
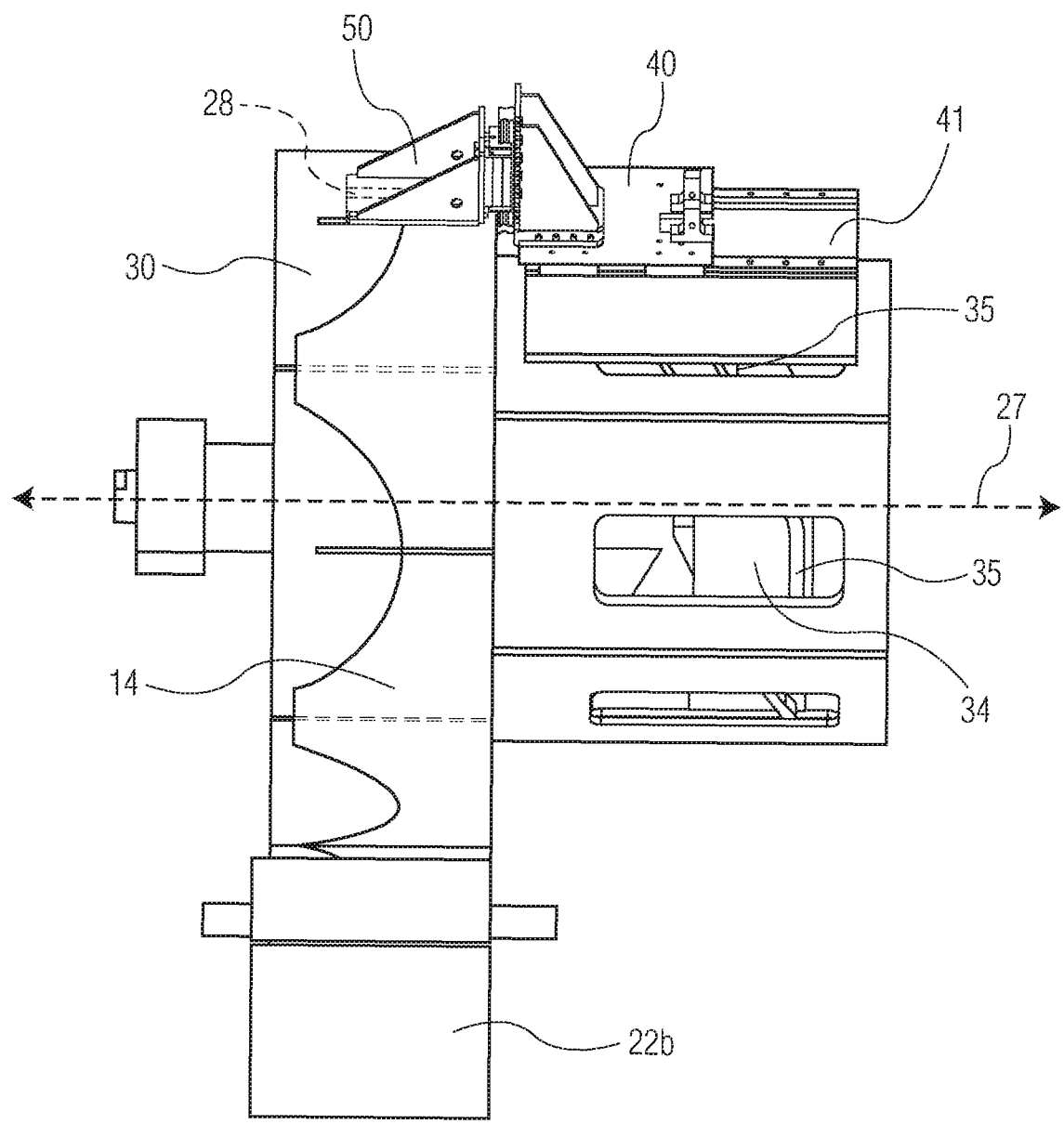
FIG. 10B is a side view showing the energy apparatus of FIG. 1 OA, as viewed from a downstream side of the rotatable drum.

FIGS. 10A and 10B illustrate phase four of the run condition setting of the energy apparatus 10. With the bonding of the web 14 being completed in phase three, the second energy mechanism 28 can move in both a radial direction 29 and an axial direction 27 to provide clearance for the web 14 as it prepares to disengage from the rotatable drum 12. As depicted in FIGS. 10A and 10B, the second energy mechanism 28 can move both axially and radially via the translation system 32 as described above to provide this clearance in phase four. As can be seen in FIG. 10B, the rib 35 on the first drive-side cam 34 guides the cam follower 36 (labeled in FIG. 5) away from the rotatable drum 12 in the axial direction 27. As a result, the sled 40 can slide on the rails 41 to move the frame 50 and the second energy mechanism 28 in the axial direction 27. Additionally, the frame 50 can move in a radial direction 29 away from the circumference 30 of the rotatable drum 12 by sliding on the rails 52, increasing the radial clearance of the second energy mechanism 28 from the web 14 and the rotatable drum 12. This radial movement can be accomplished similar to that as described above in FIGS. 9A-9C, but in a way to move the second energy transfer mechanism 28 away from the rotatable drum 12. As discussed above and as labeled in FIG. 5, the second cam follower 45 can follow the second drive-side cam 44 and the first connecting link 42 and the second connecting link 46 can each pivot about the first pivot point P1, with the angle α between the first connecting link 42 and the second connecting link 46 being maintained by the actuator 54. As the second connecting link 46 pivots about the first pivot point P1, the third connecting link 48 can pivot about the second pivot point P2 to raise the frame 50 on the rails 52 mounted on the sled 40. The second energy mechanism 28 can be coupled to the frame 50, and thus, can be raised in the radial direction 29 with the frame 50. In moving both axially and radially, the second energy mechanism 28 can return to the run condition starting position at the end of phase four so that the four phase run condition can begin again, starting with phase 1 as described above with respect to FIGS. 6A and 6B.

The energy apparatus 10 can also be configured to include an additional benefit by having the second energy mechanism 28 be selectively rotated around the center point CP of the circumference 30 of the rotatable drum 12 in either the run condition setting (as described above) or a thread-up condition setting. The thread-up condition setting of the energy apparatus 10 can provide additional radial clearance for the web 14 as the second energy mechanism 28 rotates around the center point CP of the rotatable drum 12. The thread-up condition setting of the energy apparatus can be beneficial to be selected when starting up a machine line including the energy apparatus 10 until proper phasing and speed is achieved to place the energy apparatus in a run condition setting.

Figure 11A:
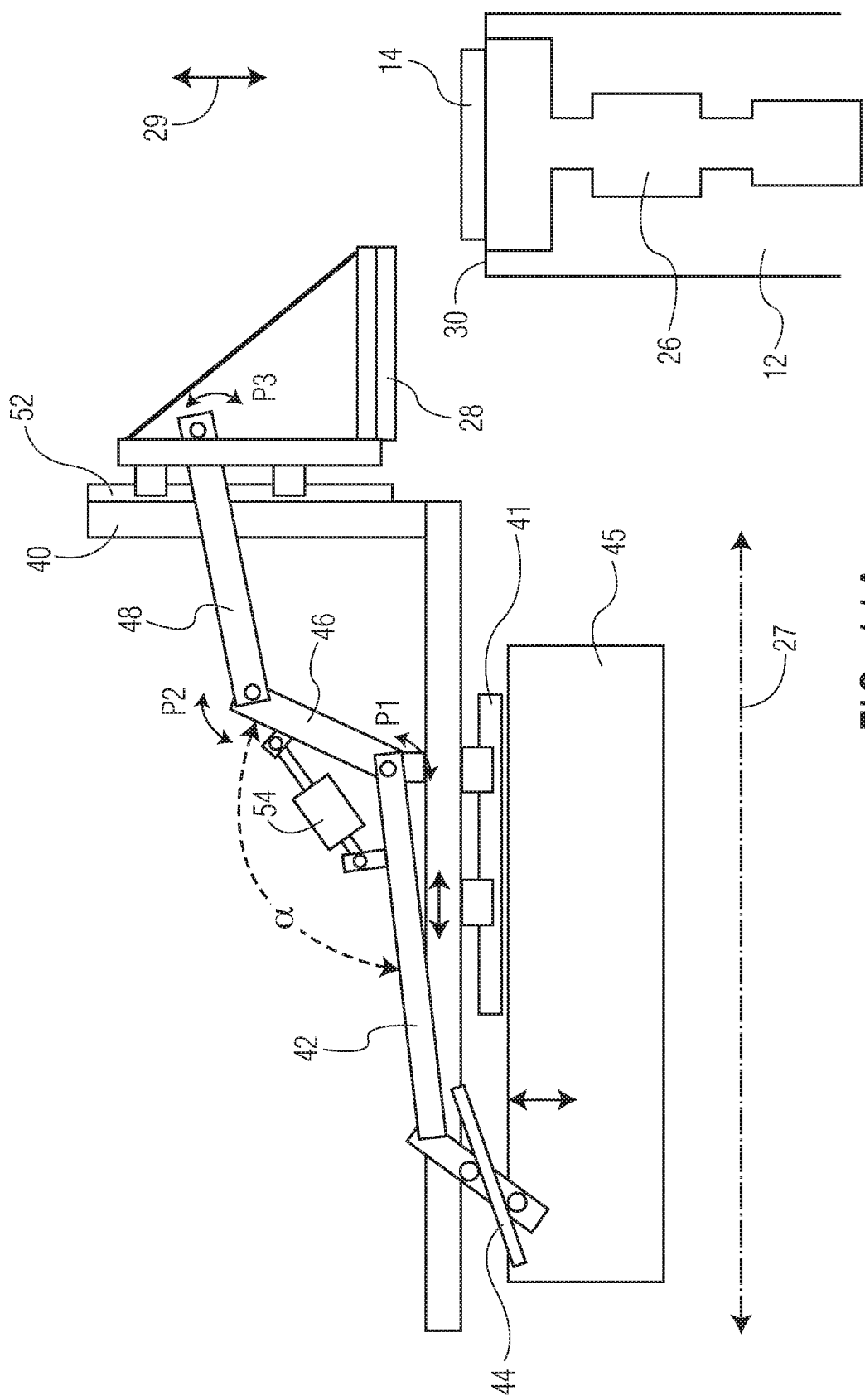
FIG. 11A is a side view of the energy apparatus of FIG. 1 in the run condition setting start position.
Figure 11B:
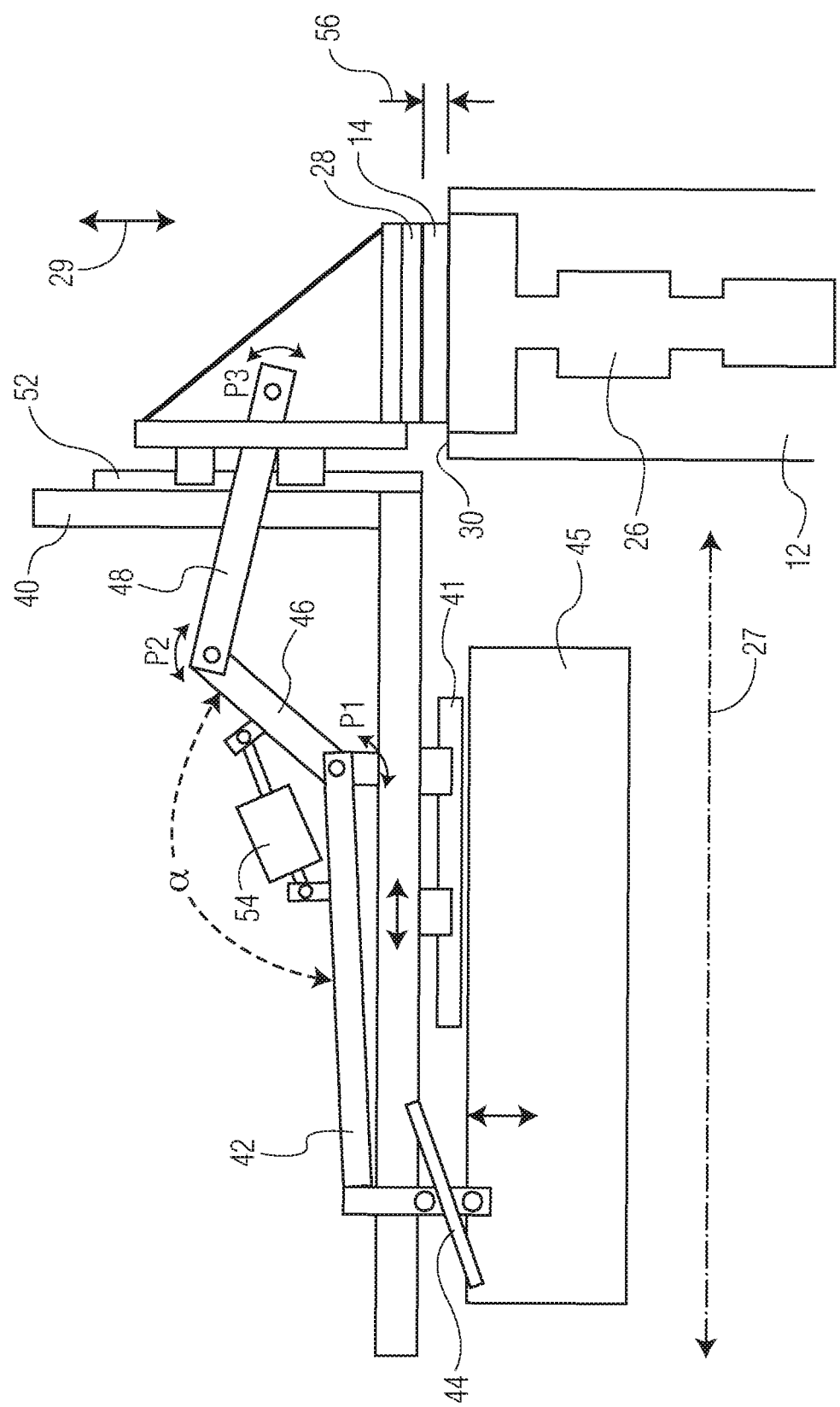
FIG. 11B is a side view of the energy apparatus of FIG. 1 in the run condition setting end position.

FIGS. 11A and 11B illustrate the movement of the second energy mechanism 28 between a run condition setting start position (FIG. 11A) and a run condition setting end position (FIG. 11B). As described above with respect to FIGS. 6A-10B, the second energy mechanism 28 can rotate around a center point CP of the circumference 30 of the rotatable drum 12 through four phases of the run condition setting and can move in both the axial direction 27 and the radial direction 29. The run condition setting end position, as illustrated in FIG. 11B, can occur when the first and second energy mechanisms 26, 28 are providing energy to the web 14 in phase 3 of the run condition setting. Depending on the desired settings for the energy transfer, the radial gap 56 between the second energy mechanism 28 and the circumference 30 of the rotatable drum 12 (and the first energy mechanism 26) can vary, however, the radial gap 56 must be close enough to effect the desired energy transfer between the second energy mechanism 28 and the first energy mechanism 26.

Figure 12A:
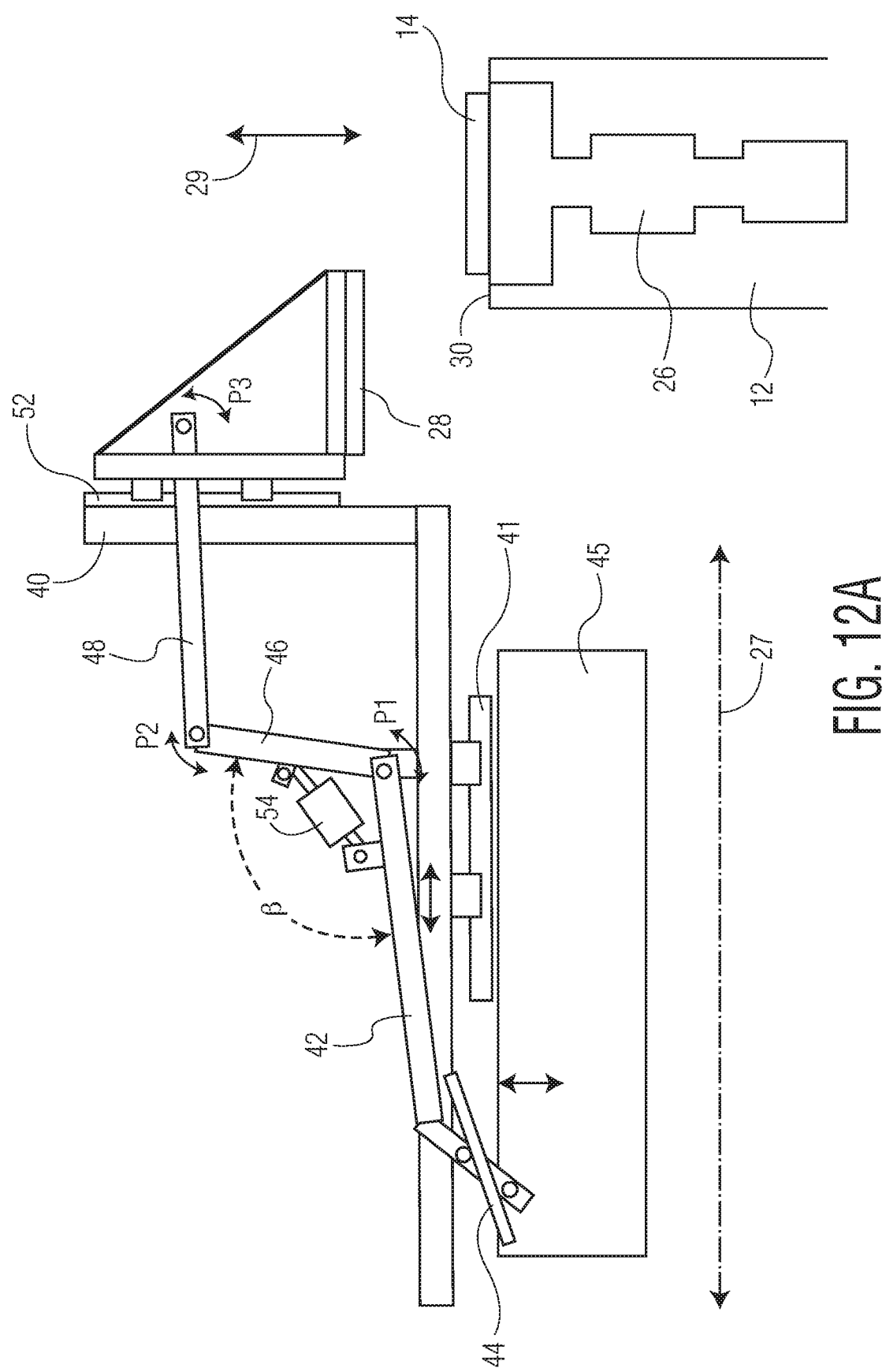
FIG. 12A is a side view of the energy apparatus of FIG. 1 in the thread-up condition setting start position.
Figure 12B:
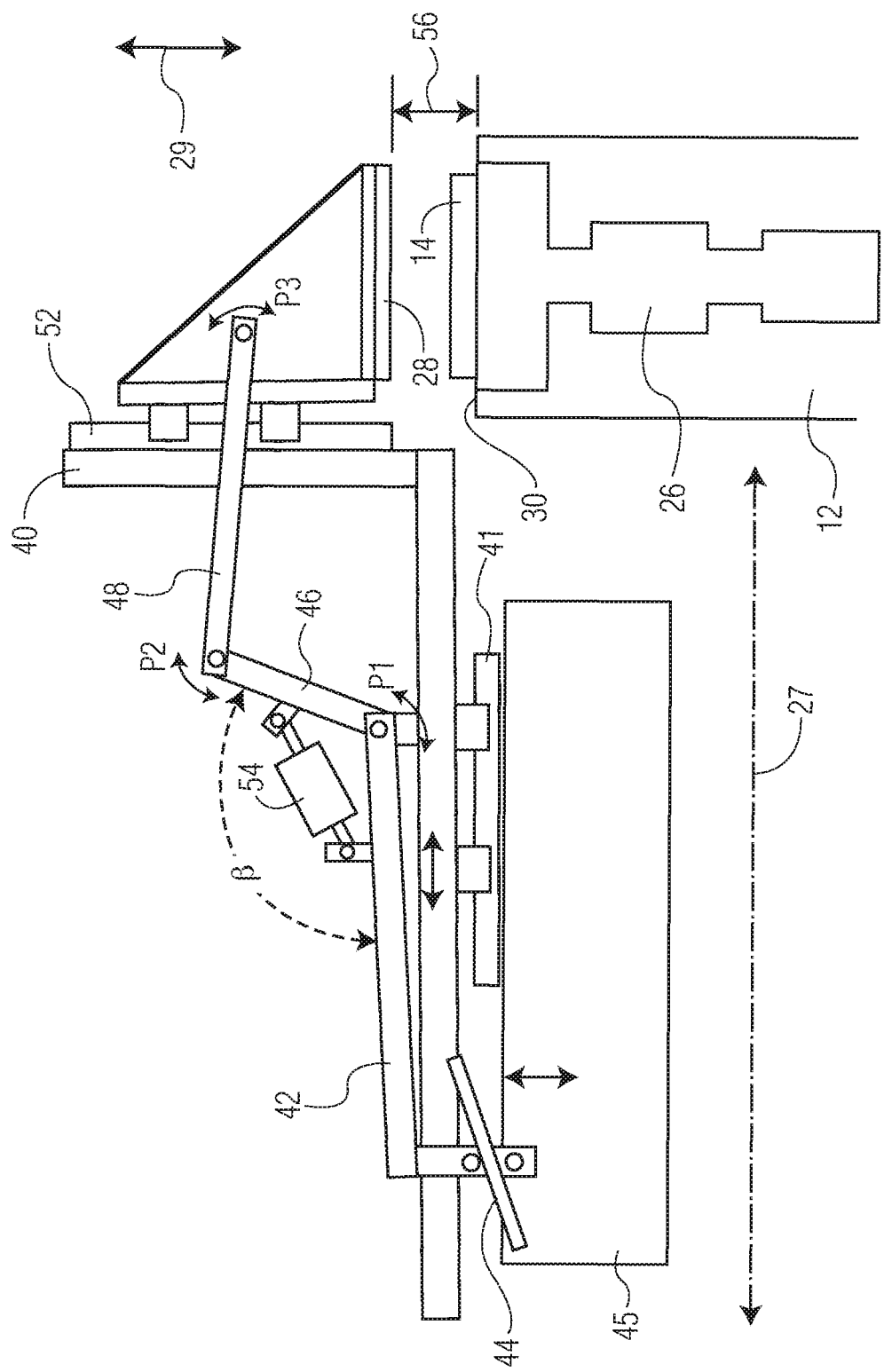
FIG. 12B is a side view of the energy apparatus of FIG. 1 in the thread-up condition setting end position.

FIGS. 12A and 12B illustrate the movement of the second energy mechanism 28 between a thread-up condition setting start position (FIG. 12A) and a thread-up condition setting end position (FIG. 12B). In the thread-up condition setting, the second energy mechanism 28 can rotate around a center point CP of the circumference 30 of the rotatable drum 12 through four phases similar to that as described above for the run condition setting, however, the thread-up condition setting is configured to not complete any bonding during phase three. Instead, the thread-up condition setting of the energy apparatus 10 is configured to have an increased radial gap between the second energy mechanism 28 and the rotatable drum 12 (or the first energy mechanism 26) in the third phase of rotation around the center point CP of the circumference 30 of the rotatable drum 12 to provide clearance for the web 14 to rotate around the rotatable drum 12. Comparing the thread-up condition setting end position of FIG. 12B to the run condition setting end position of FIG. 11B, it can be seen that a radial gap 56 between the second energy mechanism 28 and the rotatable drum 12 at the thread-up condition setting end position is greater than a radial gap 56 between the second energy mechanism 28 and the rotatable drum 12 at the run condition setting end position.

The energy apparatus 10 can be configured to transition between the run condition setting and the thread-up condition setting based on the configuration of the translation system 32. In the run condition setting as illustrated in FIGS. 11A and 11B, the actuator 54 can be extended and can maintain an angle α between the first connecting link 42 and the second connecting link 46. In the thread-up condition setting, the actuator 54 can be actuated such that its length is shortened and an angle β is maintained between the first connecting link 42 and the second connecting link 46, with angle β being less than angle α. By actuating the actuator 54 in this manner, the energy apparatus 10 can be selectively run between the run condition setting and the thread-up condition setting. As illustrated in FIGS. 11A-12B, the second energy mechanism 28 can be configured such that a radial distance of movement of the second energy mechanism 28 in the run condition setting is substantially the same as a radial distance of movement of the second energy mechanism 28 in the thread-up condition setting. Additionally, the second energy mechanism 28 can be configured such that an axial distance of movement of the second energy mechanism 28 in the run condition setting is substantially the same as an axial distance of movement of the second energy mechanism 28 in the thread-up condition setting.

EMBODIMENTS

Embodiment 1: An energy apparatus configured for providing energy to an item being transferred over a rotatable drum, the energy apparatus comprising: a first energy mechanism configured to be fixedly coupled to the rotatable drum and rotate with the rotatable drum; a second energy mechanism configured to rotate around a circumference of the rotatable drum; and a translation system coupled to the second energy mechanism and configured to move the second energy mechanism to an end position that allows the second energy mechanism and the first energy mechanism to provide energy to the item while there is no relative motion between the first energy mechanism and the second energy mechanism.

Embodiment 2: The energy apparatus of embodiment 1, wherein the energy apparatus is configured to provide sonic energy to the item to bond the item.

Embodiment 3: The energy apparatus of embodiment 1 or 2, wherein the first energy mechanism is an ultrasonic horn and the second energy mechanism is an anvil.

Embodiment 4: The energy apparatus of any of the preceding embodiments, wherein the item is a web and wherein the translation system is configured to move the second energy mechanism between the end position and a start position, the start position allowing the web to engage with and disengage from the rotatable drum without interference from the second energy mechanism.

Embodiment 5: The energy apparatus of any one of the preceding embodiments, wherein the translation system is configured to maintain the second energy mechanism in the end position for an angle of rotation of the rotatable drum of between about 50° to about 150°.

Embodiment 6: The energy apparatus of any one of the preceding embodiments, wherein the translation system is configured to move the second energy mechanism in an axial direction, the axial direction being parallel to a longitudinal axis of the rotatable drum.

Embodiment 7: The energy apparatus of any one of the preceding embodiments, wherein the translation system comprises: a first drive-side cam; at least one cam follower configured to travel along a path of the first drive-side cam; and a sled coupled to the cam follower and to the second energy mechanism.

Embodiment 8: The energy apparatus of any one of embodiments 5-7, wherein the translation system is further configured to move the second energy mechanism in a radial direction, the radial direction being radial with respect to a center point of the circumference of the rotatable drum.

Embodiment 9: The energy apparatus of any one of embodiments 5-8, wherein the translation system further comprises: a second drive-side cam; a second cam follower; the second cam follower configured to follow along a path of the second drive-side cam; a first connecting link coupled to the second cam follower and to the sled; a second connecting link coupled to the first connecting link and configured to pivot about a first pivot point; and a third connecting link coupled to the second connecting link and to the second energy mechanism, the third connecting link configured to pivot about a second pivot point.

Embodiment 10: The energy apparatus of embodiment 9, wherein the translation system further comprises an actuator coupled to the first connecting link and the second connecting link, the actuator configured to be selectively retractable to pivot the second connecting link about the first pivot point and to pivot the third connecting link about the second pivot point between the second connecting link and the third connecting link to assist in raising the second energy mechanism in the radial direction.

Embodiment 11: The energy apparatus of any one of the preceding embodiments, further comprising at least two or more pairs of first and second energy mechanisms, wherein a pair of first and second energy mechanisms comprises one first energy mechanism and one second energy mechanism.

Embodiment 12: The energy apparatus of any one of the preceding embodiments, further comprising the rotatable drum.

Embodiment 13: An energy apparatus configured for providing energy to a web being transferred over a rotatable drum, the energy apparatus comprising: a first energy mechanism configured to be coupled to the rotatable drum and rotate with the rotatable drum; and a second energy mechanism configured to rotate around a circumference of the rotatable drum; wherein the second energy mechanism is configured to be selectively rotated around the rotatable drum in at least two condition settings, the at least two condition settings comprising: a run condition setting, the run condition setting being configured to allow the second energy mechanism to move in an axial direction parallel to a longitudinal axis of the rotatable drum and a radial direction being radial with respect to a center point of the circumference of the rotatable drum between a run condition setting start position and a run condition setting end position; and a thread-up condition setting, the thread-up condition setting being configured to allow the second energy mechanism to move in the axial direction and the radial direction between a thread-up condition setting start position and a thread-up condition setting end position; wherein a radial gap between the second energy mechanism and the rotatable drum at the thread-up condition setting end position is greater than a radial gap between the second energy mechanism and the rotatable drum at the run condition setting end position.

Embodiment 14: The energy apparatus of embodiment 13, wherein the run condition setting and the thread-up condition setting are further configured such that an axial distance of movement of the second energy mechanism in the run condition setting is substantially the same as an axial distance of movement of the second energy mechanism in the thread-up condition setting, and such that a radial distance of movement of the second energy mechanism in the run condition setting is substantially the same as a radial distance of movement of the second energy mechanism in the thread-up condition setting.

Embodiment 15: The energy apparatus of embodiment 13 or 14, further comprising: a translation system coupled to the second energy mechanism and configured to move the second energy mechanism between the run condition setting start position and the run condition setting end position and between the thread-up condition setting start position and the thread-up condition setting end position, the translation system comprising an actuator that is configured to actuate to select the thread-up condition setting.

Embodiment 16: The energy apparatus of any one of embodiments 13-15, wherein the translation system is configured to allow the second energy mechanism and the first energy mechanism to provide energy to the web with no relative motion between the first energy mechanism and the second energy mechanism when the second energy mechanism is in the run condition setting end position.

Embodiment 17: A method of providing energy to an item, the method comprising: transferring the item in a machine direction towards a rotatable drum; rotating the rotatable drum; providing an energy apparatus comprising: a first energy mechanism coupled to the rotatable drum and rotating with the rotatable drum; a second energy mechanism rotating around a circumference of the rotatable drum; and a translation system coupled to the second energy mechanism and configured to move the second energy mechanism in a run condition setting between a run condition setting start position and a run condition setting end position; engaging the item with the rotatable drum; transferring the item on the outer circumference of the rotatable drum; moving the second energy mechanism from the run condition setting start position to the run condition setting end position; rotating the second energy mechanism in the run condition setting end position around the rotatable drum with no relative movement with respect to the first energy mechanism; and providing energy to the item when the second energy mechanism is in the run condition setting end position and rotating around the rotatable drum with no relative movement with respect to the first energy mechanism.

Embodiment 18: The method of embodiment 17, wherein the item is a web, and wherein the energy provided to the web is ultrasonic energy, the first energy mechanism is an ultrasonic horn, and the second energy mechanism is an anvil.

Embodiment 19: The method of embodiment 17 or 18, wherein the translation system moves the second energy mechanism in an axial direction and a radial direction between the run condition setting start position and the run condition setting end position, the axial direction being parallel to a longitudinal axis of the rotatable drum and the radial direction being radial with respect to a center point of the circumference of the rotatable drum.

Embodiment 20: The method of any one of embodiments 17-19, wherein the item is a web, the method further comprising: selectively operating the energy apparatus in the run condition setting and a thread-up condition setting; wherein in the run condition setting the second energy mechanism moves in an axial direction and a radial direction between the run condition setting start position and the run condition setting end position, the axial direction being parallel to a longitudinal axis of the rotatable drum and the radial direction being radial with respect to a center point of the circumference of the rotatable drum; wherein in the thread-up condition setting the second energy mechanism moves in the axial direction and the radial direction between a thread-up condition setting start position and a thread-up condition setting end position; and wherein a radial gap between the second energy mechanism and the rotatable drum at the thread-up condition setting end position is greater than a radial gap between the second energy mechanism and the rotatable drum at the run condition setting end position.

All documents cited in the Detailed Description are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by references, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An energy apparatus configured for providing energy to an item being transferred over a rotatable drum, the energy apparatus comprising:

a first energy mechanism configured to be fixedly coupled to the rotatable drum and rotate with the rotatable drum;

a second energy mechanism configured to rotate around a circumference of the rotatable drum; and a translation system coupled to the second energy mechanism and configured to move the second energy mechanism to an end position that allows the second energy mechanism and the first energy mechanism to provide energy to the item while there is no relative motion between the first energy mechanism and the second energy mechanism, wherein the translation system comprises:

a first drive-side cam, a first cam follower configured to travel along a path of the first drive-side cam, and a sled coupled to the first cam follower and to the second energy mechanism with the first drive-side cam and the first cam follower configured to move the secondary energy mechanism to the end position in a radial direction with respect to a center point of the circumference of the rotatable drum, and a second drive-side cam, a second cam follower configured to travel along a path of the second drive-side cam with the second drive-side cam and the second cam follower configured to move the second energy mechanism to the end position in an axial direction parallel to a longitudinal axis of the rotatable drum.

2. The energy apparatus of claim 1, wherein the energy apparatus is configured to provide sonic energy to the item to bond the item.

3. The energy apparatus of claim 2, wherein the first energy mechanism is an ultrasonic horn and the second energy mechanism is an anvil.

4. The energy apparatus of claim 1, wherein the item is a web and wherein the translation system is configured to move the second energy mechanism between the end position and a start position, the start position allowing the web to engage with and disengage from the rotatable drum without interference from the second energy mechanism.

5. The energy apparatus of claim 4, wherein the translation system is configured to maintain the second energy mechanism in the end position for an angle of rotation of the rotatable drum of between about 50° to about 150°.

6. The energy apparatus of claim 1, wherein the translation system further comprises:

a first connecting link coupled to the second cam follower and to the sled;

a second connecting link coupled to the first connecting link and configured to pivot about a first pivot point; and a third connecting link coupled to the second connecting link and to the second energy mechanism, the third connecting link configured to pivot about a second pivot point.

7. The energy apparatus of claim 6, wherein the translation system further comprises an actuator coupled to the first connecting link and the second connecting link, the actuator configured to be selectively retractable to pivot the second connecting link about the first pivot point and to pivot the third connecting link about the second pivot point between the second connecting link and the third connecting link to assist in raising the second energy mechanism in the radial direction.

8. An energy apparatus configured for providing energy to a web being transferred over a rotatable drum, the energy apparatus comprising:

a first energy mechanism configured to be coupled to the rotatable drum and rotate with the rotatable drum; and
a second energy mechanism configured to rotate around a circumference of the rotatable drum;
wherein the second energy mechanism is configured to be selectively rotated around the rotatable drum in at least two condition settings, the at least two condition settings comprising:
a run condition setting, the run condition setting being configured to allow the second energy mechanism to move in an axial direction parallel to a longitudinal axis of the rotatable drum and a radial direction being radial with respect to a center point of the circumference of the rotatable drum between a run condition setting start position and a run condition setting end position; and
a thread-up condition setting, the thread-up condition setting being configured to allow the second energy mechanism to move in the axial direction and the radial direction between a thread-up condition setting start position and a thread-up condition setting end position;
wherein a radial gap between the second energy mechanism and the rotatable drum at the thread-up condition setting end position is greater than a radial gap between the second energy mechanism and the rotatable drum at the run condition setting end position.

9. The apparatus of claim 8, wherein the run condition setting and the thread-up condition setting are further configured such that an axial distance of movement of the second energy mechanism in the run condition setting is substantially the same as an axial distance of movement of the second energy mechanism in the thread-up condition setting, and such that a radial distance of movement of the second energy mechanism in the run condition setting is substantially the same as a radial distance of movement of the second energy mechanism in the thread-up condition setting.

10. The apparatus of claim 8, further comprising:
a translation system coupled to the second energy mechanism and configured to move the second energy mechanism between the run condition setting start position and the run condition setting end position and between the thread-up condition setting start position and the thread-up condition setting end position, the translation system comprising an actuator that is configured to actuate to select the thread-up condition setting.

11. The apparatus of claim 10, wherein the translation system is configured to allow the second energy mechanism and the first energy mechanism to provide energy to the web with no relative motion between the first energy mechanism and the second energy mechanism when the second energy mechanism is in the run condition setting end position.

12. A method of providing energy to an item, the method comprising:
transferring the item in a machine direction towards a rotatable drum;
rotating the rotatable drum;
providing an energy apparatus comprising:
a first energy mechanism coupled to the rotatable drum and rotating with the rotatable drum;
a second energy mechanism rotating around a circumference of the rotatable drum; and
a translation system coupled to the second energy mechanism and configured to move the second energy mechanism in a run condition setting between a run condition setting start position and a run condition setting end position, the translation system comprising:
a first drive-side cam, a first cam follower configured to travel along a path of the first drive-side cam, and a sled coupled to the first cam follower and to the second energy mechanism with the first drive-side cam and the first cam follower configured to move the secondary energy mechanism to the end position in a radial direction with respect to a center point of the circumference of the rotatable drum, and
a second drive-side cam, a second cam follower configured to travel along a path of the second drive-side cam with the second drive-side cam and the second cam follower configured to move the second energy mechanism to the end position in an axial direction parallel to a longitudinal axis of the rotatable drum;
engaging the item with the rotatable drum;
transferring the item on the outer circumference of the rotatable drum;
moving the second energy mechanism from the run condition setting start position to the run condition setting end position;
rotating the second energy mechanism in the run condition setting end position around the rotatable drum with no relative movement with respect to the first energy mechanism; and
providing energy to the item when the second energy mechanism is in the run condition setting end position and rotating around the rotatable drum with no relative movement with respect to the first energy mechanism.

13. The method of claim 12, wherein the item is a web, and wherein the energy provided to the web is ultrasonic energy, the first energy mechanism is an ultrasonic horn, and the second energy mechanism is an anvil.

14. The method of claim 12, wherein the item is a web, the method further comprising:
selectively operating the energy apparatus in the run condition setting and a thread-up condition setting;
wherein in the run condition setting the second energy mechanism moves in the axial direction and the radial direction between the run condition setting start position and the run condition setting end position,
wherein in the thread-up condition setting the second energy mechanism moves in the axial direction and the radial direction between a thread-up condition setting start position and a thread-up condition setting end position; and
wherein a radial gap between the second energy mechanism and the rotatable drum at the thread-up condition setting end position is greater than a radial gap between the second energy mechanism and the rotatable drum at the run condition setting end position.

15. The energy apparatus of claim 1, further comprising a linkage system having at least one pivot point coupling the second energy mechanism to the second cam follower, the linkage system being configurable to produce a first gap between the first energy mechanism and the second energy mechanism while the second energy mechanism is in an end position while the linkage system is in a first configuration and to produce a second, different gap between the first energy mechanism and the second energy mechanism while the second energy mechanism is in an end position while the linkage system is in a second configuration.

16. The energy apparatus of claim 15, wherein the linkage system comprises an actuator to change the linkage system between the first configuration and the second configuration.

17. The energy apparatus of claim 1, wherein the translation system is configured to move the second energy mechanism from a start position to an end position where the second energy mechanism is axially displaced from the first energy mechanism in the start position.

18. The method of claim 14, wherein the energy apparatus further comprises: a linkage system having at least one pivot point coupling the second energy mechanism to the second cam follower, the linkage system being configurable to produce a first radial gap between the first energy mechanism and the second energy mechanism while the second energy mechanism is in the run condition setting end position while the linkage system is in a first configuration and to produce a second radial gap between the first energy mechanism and the second energy mechanism while the second energy mechanism is in the thread-up condition setting end position while the linkage system is in a second configuration.

19. The method of claim 18, wherein the linkage system comprises an actuator to change the linkage system between the first configuration and the second configuration.

20. The method of claim 12, wherein the translation system is configured to move the second energy mechanism from a start position to an end position where the second energy mechanism is axially displaced from the first energy mechanism in the start position.

* * * * *